(12) United States Patent
Yang et al.

(10) Patent No.: US 10,099,935 B2
(45) Date of Patent: Oct. 16, 2018

(54) MOLECULAR SIEVE, MANUFACTURING METHOD THEREFOR, AND USES THEREOF

(71) Applicants: China Petroleum & Chemical Corporation, Beijing (CN); Shanghai Research Institute of Petrochemical Technology, Sinopec, Shanghai (CN)

(72) Inventors: Weimin Yang, Shanghai (CN); Zhendong Wang, Shanghai (CN); Hongmin Sun, Shanghai (CN); Bin Zhang, Shanghai (CN); Mingyao Huan, Shanghai (CN); Zhenhao Shen, Shanghai (CN); Mingwei Xue, Shanghai (CN)

(73) Assignees: CHINA PETROLEUM & CHEMICAL CORPORATION, Beijing (CN); SHANGHAI RESEARCH INSTITUTE OF PETROCHEMICAL TECHNOLOGY, SINOPEC, Shanghai (CN)

( * ) Notice: Subject to any disclaimer, the term of this patent is extended or adjusted under 35 U.S.C. 154(b) by 70 days.

(21) Appl. No.: 15/024,604

(22) PCT Filed: Sep. 24, 2014

(86) PCT No.: PCT/CN2014/000867
§ 371 (c)(1),
(2) Date: Mar. 24, 2016

(87) PCT Pub. No.: WO2015/043114
PCT Pub. Date: Apr. 2, 2015

(65) Prior Publication Data
US 2017/0001873 A1    Jan. 5, 2017

(30) Foreign Application Priority Data

Sep. 24, 2013 (CN) .......................... 2013 1 0436076
Sep. 24, 2013 (CN) .......................... 2013 1 0436460

(51) Int. Cl.
C01B 39/48 (2006.01)
B01J 29/70 (2006.01)
(Continued)

(52) U.S. Cl.
CPC ............... *C01B 39/48* (2013.01); *B01J 20/18* (2013.01); *B01J 20/28061* (2013.01);
(Continued)

(58) Field of Classification Search
CPC ....... C01B 39/48; B01J 29/7038; B01J 20/18; B01J 20/28061; B01J 20/28064;
(Continued)

(56) References Cited

U.S. PATENT DOCUMENTS 4,954,325 A   9/1990  Rubin et al.
5,012,033 A * 4/1991  Child ...................... B01J 29/04
                                              585/722

(Continued)

FOREIGN PATENT DOCUMENTS

CN   1057641 A    1/1992
CN   1535918 A   10/2004
(Continued)

OTHER PUBLICATIONS

International Search Report for International Application No. PCT/CN2014/000867, dated Dec. 29, 2014.
(Continued)

*Primary Examiner* — David M Brunsman
(74) *Attorney, Agent, or Firm* — Novick, Kim & Lee, PLLC

(57) ABSTRACT

This invention relates to a molecular sieve, especially a SCM-1 molecular sieve or SCM-2 molecular sieve of the MWW family as represented in FIGS. 1 and 2. As compared with a prior art molecular sieve, the molecular sieve according to this invention exhibits improved catalytic performance and good service life and regeneration performance.

(Continued)

Figure 1:
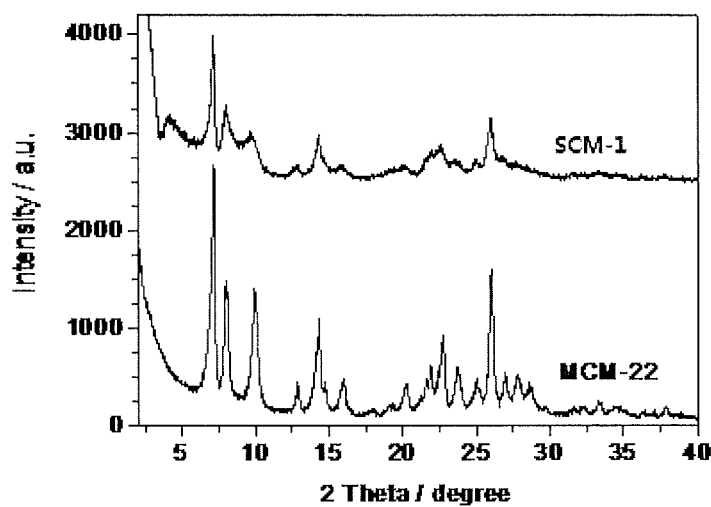

The molecular sieve can be produced with a simplified procedure, under mild operation conditions, with less energy and material consumption and fewer side reactions, with a high product purity at low cost and a high yield. This invention further relates to a process for producing these molecular sieves and use thereof as an adsorbent or a catalyst.

10 Claims, 2 Drawing Sheets

(51) Int. Cl.
| | |
|---|---|
| C10G 29/20 | (2006.01) |
| B01J 20/18 | (2006.01) |
| B01J 20/28 | (2006.01) |
| B01J 35/10 | (2006.01) |
| B01J 38/02 | (2006.01) |
| B01J 38/12 | (2006.01) |
| B01J 29/90 | (2006.01) |
| B01J 35/00 | (2006.01) |

(52) U.S. Cl.
CPC ... *B01J 20/28064* (2013.01); *B01J 20/28073* (2013.01); *B01J 29/7038* (2013.01); *B01J 29/90* (2013.01); *B01J 35/002* (2013.01); *B01J 35/1019* (2013.01); *B01J 35/1023* (2013.01); *B01J 35/1042* (2013.01); *B01J 38/02* (2013.01); *B01J 38/12* (2013.01); *C10G 29/205* (2013.01); *C01P 2002/72* (2013.01); *C01P 2006/12* (2013.01); *C01P 2006/14* (2013.01)

(58) Field of Classification Search
CPC ............. B01J 20/28073; C10P 2002/72; C10P 2006/12; C10P 2006/14
See application file for complete search history.

(56) References Cited

U.S. PATENT DOCUMENTS

| | | |
|---|---|---|
| 2006/0100095 A1 | 5/2006 | Mertens et al. |
| 2008/0027260 A1* | 1/2008 | Lai .......................... C07C 39/06 585/475 |

FOREIGN PATENT DOCUMENTS

| | | |
|---|---|---|
| CN | 1565968 A | 1/2005 |
| CN | 1789126 A | 6/2006 |
| CN | 1843914 A | 10/2006 |
| CN | 101239728 A | 8/2008 |
| CN | 102452665 A | 5/2012 |
| WO | WO 19970017290 A1 | 5/1997 |
| WO | 2008013644 A1 | 1/2008 |

OTHER PUBLICATIONS

Written Opinion of the International Search Authority for Application No. PCT/CN2014/000867, dated Dec. 29, 2014.
International Preliminary Report on Patentability or Application No. PCT/CN2014/000867, dated Mar. 29, 2016.
Supplementary Examination Report dated Nov. 28, 2016 for Singapore Application No. 11201602303P.
Onida, B et al., "IR study of the acidity of ITQ-2, an "all-surface" zeolitic system," Journal of Catalysis, vol. 214, 2003, pp. 191-199.
The Extended European Search Report for Application No. 14849642.5, dated Feb. 27, 2017.
Xie, S. et al., "Synthesis and characterization of MCM-49/ZSM-35 composite zeolites in the hexamethyleneimine and cyclohexamine system", Microporous and Mesoporous Materials, vol. 121, 2009; pp. 166-172.
European Patent Office, Office Action for EP application No. 14849642.5, dated Apr. 16, 2018.

* cited by examiner

MOLECULAR SIEVE, MANUFACTURING METHOD THEREFOR, AND USES THEREOF

TECHNICAL FIELD

This invention relates to a molecular sieve, especially to a SCM-1 molecular sieve or SCM-2 molecular sieve of the MWW family. This invention further relates to a process for producing these molecular sieves and use thereof as an adsorbent or a catalyst.

BACKGROUND ART

MCM-22 molecular sieve has a MWW topological structure, and two sets of independent ten-membered ring pore systems which do not communicate with each other, one of which comprises two-dimensional sinusoidal pores having a cross section of approximately ellipse shape with a pore size of 4.1 Å×5.1 Å, the other of which comprises twelve-membered ring supercages of approximately cylindrical shape with a size of 7.1 Å×7.1 Å×18.2 Å, which supercage communicates with the outside through a slightly distorted ten-membered ring opening (4.0 Å×5.5 Å). Moreover, the MCM-22 molecular sieve has bowl shaped twelve-membered ring semi-supercages located on the external surface of the crystal.

Based on the study of the structure of the MCM-22 molecular sieve by found that there is some significant difference in structure between a MCM-22 molecular sieve precursor powder without removing templates by calcination (MCM-22(P)) and a MCM-22 molecular sieve after calcination (MCM-22(C)). Upon comparison of the lattice parameters thereof, there is found that MCM-22(P) and MCM-22(C) share the same lattice parameter a(b), both being 1.427 nm, while MCM-22(C) has a lattice parameter c of 2.52 nm, and MCM-22(P) has a lattice parameter c of 2.68 nm. The same lattice parameters a(b) indicate that the layered structure already formed with the MCM-22(P) does not change during calcination. On the basis of this, the mechanism under which a MCM-22(P) is converted into a MCM-22(C) by calcination to remove templates is deduced as: first of all, the templates between different layers desorb and decompose at elevated temperatures, and at the same time, silanol groups (Si—OH) are formed on the surface of the layered structure, and then, the Si—OH groups on the surface dehydrate by condensation into Si—O—Si bonds, whereby connecting adjacent layered structures into a multi-layered structure.

The MCM-22 molecular sieve generally presents as a flake or thin plate morphology, with a size of about 2 μm, a thickness of from more than 10 to tens nm. Upon study of the MCM-22 molecular sieve crystal by transmission electron microscope, it is found that the flake crystal of the MCM-22 molecular sieve has a multi-layered structure made by connecting numbers of "elementary building layer structure" having a thickness of about 2.5 nm with oxo bridging bonds. Depends on the thickness of the molecular sieve crystal, the multi-layered structure may be made of different numbers of elementary building layer structure, generally more than 5, or even up to 10 or more.

In the multi-layered structure of the MCM-22 molecular sieve, the two sets of ten-membered ring pore locate inside the layered structure and between two adjacent elementary building layer structures respectively, imposing strict restriction on molecular diffusion, while the twelve-membered ring semi-supercages locating on the surface of the crystal facilitate molecular diffusion. In fact, when a MCM-22 molecular sieve is used to catalysis an alkylation reaction in liquid phase of benzene and ethylene, the reaction is found to only occur in the bowl shaped semi-supercages on the crystal surface, while the ten-membered ring pores inside and between the layered structure are inaccessible to the reaction.

To make more effective use of these ten-membered ring pores of a MCM-22 molecular sieve between different layers, and to expose as much as possible twelve-membered ring supercages inside its structure, for example, WO9717290 developed a process comprising swelling a MCM-22(P), and then ultrasonicating the swelled MCM-22 (P) to destroy the interaction between different elementary building layer structures whereby taking apart the elementary building layer structures, so as to obtain an ITQ-2 molecular sieve having only one single elementary building layer structure (also called as single layered structure). This ITQ-2 molecular sieve has been identified as a novel molecular sieve having a MWW topological structure in this field. Due to this specific single layered structure, the ITQ-2 molecular sieve has a crystal thickness of only about 2.5 nm. As compared with the MCM-22 molecular sieve, the ITQ-2 molecular sieve is retained with only the ten-membered ring pores inside the layer, while the ten-membered ring pores comprising cylindrical twelve-membered ring supercages between adjacent layers are totally destroyed, wherein the supercage is divided into two bowl shaped semi-supercages and rendered totally open. Then, the ITQ-2 molecular sieve is significantly improved with its external specific surface area (generally about 700 m$^2$ g$^{-1}$ vs. only about 100 m$^2$ g$^{-1}$ for a MCM-22 molecular sieve), showing no restriction to molecular diffusion, whereby exhibiting significantly superior diffusion performances as compared with the MCM-22 molecular sieve. However, the ITQ-2 molecular sieve has only one single layered MWW topological structure, which indicates that the three dimensional structure of the MWW material has been totally destroyed by dividing one cylindrical complete supercage into two bowl shaped semi-supercages, leading to transformation of the B acid center inside the supercage into a L acid center (IR study of the acidity of ITQ-2, an "all-surface" zeolitic system, Journal of Catalysis, 214 (2003), pp. 191-199). Specifically, the acid center of the ITQ-2 molecular sieve is mainly a L acid, which is similar to the acid property of a mesoporous material. Taking into consideration of the fact that the ITQ-2 molecular sieve has a comparable specific surface area to that of a mesoporous material, the ITQ-2 molecular sieve may act more like a mesoporous material rather than a crystalline microporous molecular sieve. For these reasons, for the ITQ-2 molecular sieve, due to the destruction of its microporous structure, the ITQ-2 molecular sieve exhibits diffusion and adsorption performances comparable to a mesoporous material, and is deprived of properties, typically associated with a crystalline microporous molecular sieve, such as thermal stability, hydrothermal stability or catalytic shape selectivity. In view of this, the ITQ-2 molecular sieve is effective in converting a reactant (i.e. having a high reactant converting capability) in a reaction which is more tolerable to the intensity of the acid center or severely restricted by molecular diffusion, but ineffective in selective generation of an aimed product (i.e. having a poor product selectivity). For example, in an alkylation reaction in liquid phase between benzene and ethylene, which is a reaction in need of mid-strong or strong acids as the catalyst, due to its weaker acidity, as compared with the MCM-22 molecular sieve, the ITQ-2 molecular sieve is less applicable to this reaction. On the contrary, the Beckmann rearrangement reaction of cyclohexanone oxime to produce caprolactam is a typical diffusion-restricted reaction. In this reaction, cyclohexanone oxime is greater in molecular size than the ten-membered ring openings of the MCM-22 molecular sieve, while the product caprolactam is even much greater, for this reason, the reaction mainly occurs in the bowl shaped twelve-membered ring semi-supercages on the external surface of the crystal. In this regard, as compared with the MCM-22 molecular sieve, the ITQ-2 molecular sieve has much more opened twelve-membered ring semi-supercages, thus exhibiting significantly superior catalytic performances over the MCM-22 molecular sieve. Further, the ITQ-2 molecular sieve has to be produced in a rather complicated manner, necessarily involving at least steps of producing a MCM-22 molecular sieve precursor, and swelling and ultrasonication treatment of the thus produced MCM-22 molecular sieve precursor. In this context, the process for producing the ITQ-2 molecular sieve suffers from the problem of massive energy and material consumption. Besides, the swelling conditions are so harsh that the crystalline structure of the molecular sieve are severely destroyed in most cases, leading to a massive loss of silicon into the liquid phase, and as a consequence, it is very difficult for the ITQ-2 molecular sieve to have a yield of more than 50%. Further, during the production of the ITQ-2 molecular sieve, a swelling agent like hexadecyl trimethyl ammonium bromide (CTAB) has to be used. This swelling agent acts also like a surfactant, which leads to organization of silicon species in the liquid phase around its micelle into a mesoporous material and then isolation from the liquid phase, and is further mixed into the produced ITQ-2 molecular sieve, whereby reducing the purity of the ITQ-2 molecular sieve. A mesoporous material has much greater specific surface area than a microporous molecular sieve, and this contamination by the mesoporous material as an impurity may increase the total specific surface area and external specific surface area of the final product. However, due to its non-crystalline nature, the mesoporous material is characterized by a poor hydrothermal stability and further a poor resistance to both acid and alkali. Unfortunately, the prior art fails to develop any process to effectively remove these mesoporous materials from the produced ITQ-2 molecular sieve by now. Due to the avoidless presence of this mesoporous materials as the impurity, the catalytic performances of the ITQ-2 molecular sieve has been significantly compromised.

In practical use, in addition to good catalytic performances (including the reactant converting capability and the product selectivity), the molecular sieve is further required to has good regeneration performance. Due to its one single layered structure and the unavoidable contamination by the mesoporous material as the impurity, if the ITQ-2 molecular sieve is to be regenerated in a conventional manner, e.g. by calcination at elevated temperatures, Si—OH and Al—OH groups on its surface will dehydrate by condensation, followed by sintering and fusing of the framework structure of the molecular sieve, leading to burying and blocking of pores and loss of the active centers, resulting in significant reduction of its catalytic performances and impossible to be recovered to the same level of a fresh catalyst. Due to these problems, the ITQ-2 molecular sieve has been known for nearly 20 years since the first report of same, and observed with high performances thereof by many researchers, however, fails to be commercially used up to now.

Therefore, there is still a need for a novel molecular sieve, which shows a reactant converting capability comparable to the ITQ-2 molecular sieve even for a typical diffusion-restricted reaction, and is deprived of the problems in association with the ITQ-2 molecular sieve.

INVENTION SUMMARY

The present inventors, on the basis of the prior art, found that, if a specific organic template combination has been introduced into the process for producing a molecular sieve, a novel molecular sieve (hereinafter including a SCM-1 molecular sieve and a SCM-2 molecular sieve) can be produced in a simplified manner, which shows a reactant converting capability at least comparable to the prior art ITQ-2 molecular sieve even for a severely diffusion-restricted reaction, and is deprived of the problems in association with the ITQ-2 molecular sieve.

Specifically, this invention relates to the following aspects.

1. A molecular sieve, characterized by having an empirical chemical composition as illustrated by the formula "a first oxide·a second oxide", wherein the ratio by molar of the first oxide to the second oxide is 20-2000, preferably 25-200, the first oxide is one or more selected from the group consisting of silica and germanic oxide, preferably silica, the second oxide is one or more selected from the group consisting of alumina, boron oxide, iron oxide, gallium oxide, titanium oxide, rare earth oxides, indium oxide and vanadium oxide, preferably alumina, and the molecular sieve has an X ray diffraction pattern as substantially illustrated in the following table,

| 2θ (°) | d-spacing (Å) | relative intensity ($I/I_0 \times 100$) |
|---|---|---|
| 4.22 ± 0.30 | 21.04 ± 1.48 | w-s |
| 7.17 ± 0.18 | 12.32 ± 0.31 | vs |
| 7.99 ± 0.20 | 11.07 ± 0.28 | m-s |
| 9.71 ± 0.13 | 9.10 ± 0.12 | m-s |
| 14.37 ± 0.14 | 6.16 ± 0.06 | m-s |
| 22.67 ± 0.29 | 3.92 ± 0.05 | w-m |
| 26.03 ± 0.23 | 3.42 ± 0.03 | s |

2. The molecular sieve according to any one of the preceding aspects, wherein the X ray diffraction pattern further includes X-ray diffraction peaks as substantially illustrated in the following table.

| 2θ (°) | d-spacing (Å) | relative intensity ($I/I_0 \times 100$) |
|---|---|---|
| 12.86 ± 0.19 | 6.88 ± 0.10 | w |
| 15.90 ± 0.14 | 5.57 ± 0.05 | w |
| 20.26 ± 0.23 | 4.38 ± 0.05 | w |
| 21.93 ± 0.38 | 4.05 ± 0.07 | m |
| 23.65 ± 0.32 | 3.76 ± 0.05 | w |
| 25.07 ± 0.29 | 3.55 ± 0.04 | w |
| 26.92 ± 0.25 | 3.31 ± 0.03 | w |

3. A molecular sieve, characterized by having an empirical chemical composition as illustrated by the formula "a first oxide·a second oxide" or the formula "a first oxide·a second oxide·an organic template·water", wherein the ratio by molar of the first oxide to the second oxide is 20-2000, preferably 25-200, the ratio by weight of the organic template to the first oxide is 0.03-0.38, preferably 0.07-0.27, the ratio by weight of water to the first oxide is 0-0.15, preferably 0.02-0.11, the first oxide is one or more selected from the group consisting of silica and germanic oxide, preferably silica, the second oxide is one or more selected from the group consisting of alumina, boron oxide, iron oxide, gallium oxide, titanium oxide, rare earth oxides, indium oxide and vanadium oxide, preferably alumina, and the molecular sieve has an X ray diffraction pattern as substantially illustrated in the following table,

| 2θ (°) | d-spacing (Å) | relative intensity (I/I₀ × 100) |
|---|---|---|
| 6.38 ± 0.14 | 13.84 ± 0.30 | w |
| 7.15 ± 0.13 | 12.36 ± 0.22 | vs |
| 7.94 ± 0.12 | 11.13 ± 0.17 | m |
| 9.54 ± 0.13 | 9.27 ± 0.13 | w-m |
| 21.98 ± 0.17 | 4.04 ± 0.03 | m |
| 25.96 ± 0.15 | 3.43 ± 0.02 | m-s |
| 26.43 ± 0.16 | 3.37 ± 0.02 | m |

4. The molecular sieve according to any one of the preceding aspects, wherein the X ray diffraction pattern further includes X-ray diffraction peaks as substantially illustrated in the following table,

| 2θ (°) | d-spacing (Å) | relative intensity (I/I₀ × 100) |
|---|---|---|
| 3.87 ± 0.20 | 22.90 ± 1.21 | w |
| 12.79 ± 0.20 | 6.92 ± 0.11 | w |
| 19.76 ± 0.31 | 4.49 ± 0.07 | w-m |
| 22.55 ± 0.23 | 3.94 ± 0.04 | w-m |
| 24.92 ± 0.14 | 3.57 ± 0.02 | w |

5. The molecular sieve according to any one of the preceding aspects, wherein the total pore volume (by the BET method) is not less than 0.5 cm³/g, preferably 0.55-0.90 cm³/g, the total specific surface area (by the BET method) is not less than 450 m²/g, preferably 480-680 m²/g, the external specific surface area (by the BET method) is not less than 185 m²/g, preferably 200-400 m²/g, and the external specific surface area accounts for not less than 40%, preferably 45-65% of the total specific surface area.

6. The molecular sieve according to any one of the preceding aspects, having a MWW topological framework structure, wherein at least 80%, preferably at least 85%, more preferably at least 90%, more preferably at least 95%, more preferably at least 99% of all crystals thereof are flake crystals having a thickness of about 5 nm (by the TEM method).

7. A process for producing a molecular sieve, including a step of under crystallization conditions, contacting a first oxide source, a second oxide source, an alkali source, an organic template, an optional halogen source and water, to obtain a molecular sieve, and optionally, a step of calcinating the obtained molecular sieve, wherein the organic template is the combination of a first organic template and a second organic template, the ratio by molar of the first organic template to the second organic template is 0.1-5.0, preferably 0.3-3.5, more preferably 0.4-1.5, the first organic template is one or more of an aza monocyclic $C_{5-15}$ cycloalkane (preferably $C_{6-10}$ cycloalkane, for example, cyclohexane, cycloheptane, cyclooctane, cyclononane and cyclodecane), preferably one or more of a monoaza, diaza or triaza monocyclic $C_{5-15}$ cycloalkane (preferably $C_{6-10}$ cycloalkane, for example, cyclohexane, cycloheptane, cyclooctane, cyclononane and cyclodecane), more preferably one or more of a saturated monocyclic compound whose ring skeleton is made of

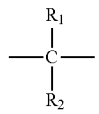

(with the number of n) and

(with the number of m), wherein $R_1$ and $R_2$ may each independently selected from the group consisting of hydrogen, a $C_{1-4}$ linear or branched alkyl and a $C_{2-4}$ linear or branched alkenyl, preferably each independently selected from the group consisting of hydrogen and methyl, most preferably hydrogen, $R_3$ represents hydrogen, the numerical value n represents an integer of from 4 to 12, preferably an integer of from 5 to 8, the numerical value m represents an integer of from 1 to 3, preferably 1 or 2, more preferably one or more selected from the group consisting of hexamethyleneimine (having a C/N ratio of 6), piperidine (having a C/N ratio of 5), 2-methyl piperidine (having a C/N ratio of 5) and homopiperazine (having a C/N ratio of 2.5), the second organic template is one or more selected from the group consisting of an aza arene and a compound represented by the following formula (I),

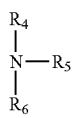

in the formula (I), $R_4$, $R_5$ and $R_6$ may be identical to or different from one another, each independently selected from the group consisting of hydrogen, a $C_{1-12}$ linear or branched alkyl, a $C_{2-12}$ linear or branched alkenyl, a $C_{5-12}$ monocyclic cycloalkyl and a $C_{5-12}$ monocyclic cycloalkenyl, with the proviso that (1) one at most out of $R_4$, $R_5$ and $R_6$ represents hydrogen, and (2) at least one (preferably at least two) out of $R_4$, $R_5$ and $R_6$ is the $C_{5-12}$ monocyclic cycloalkyl or the $C_{5-12}$ monocyclic cycloalkenyl, more preferably at least one (preferably at least two) out of $R_4$, $R_5$ and $R_6$ is the $C_{5-12}$ monocyclic cycloalkyl, the compound represented by the formula (I) is more preferably one or more selected from the group consisting of N,N-diethyl cyclohexylamine (having a C/N ratio of 10), dicyclohexylamine (having a C/N ratio of 12) and N-methyl dicyclohexylamine (having a C/N ratio of 13), the aza arene is one or more of an aza $C_{6-20}$ arene (preferably $C_{6-14}$ arene, especially benzene, naphthalene, anthracene and phenanthrene), on each nitrogen atom constituting the ring skeleton thereof, there optionally further existing one substituent group selected from the group consisting of a $C_{1-12}$ linear or branched alkyl, a $C_{2-12}$ linear or branched alkenyl, a $C_{5-12}$ monocyclic cycloalkyl, a $C_{5-12}$ monocyclic cycloalkenyl and a $C_{6-20}$ aryl, the aza arene is preferably one or more of a monoaza, diaza or triaza $C_{6-20}$ arene (preferably $C_{6-14}$ arene, especially benzene, naphthalene, anthracene and phenanthrene), more preferably one or more selected from the group consisting of quinoline (having a C/N ratio of 9), N-phenyl quinoline (having a C/N ratio of 15), N-cyclohexyl pyridine (having a C/N ratio of 11) and 6-methyl quinoline (having a C/N ratio of 9).

8. The process according to any one of the preceding aspects, wherein the aza monocyclic cycloalkane has a C/N ratio of greater than 2, more preferably 2.5 or more, the compound represented by the formula (I) has a C/N ratio of 10 or more, 12 or more or 13 or more, and the aza arene has a C/N ratio of 9 or more, 10 or more or 11 or more.

9. The process according to any one of the preceding aspects, wherein the ratio by molar between the first oxide source (calculated as the first oxide), the second oxide source (calculated as the second oxide), the alkali source, the organic template, the halogen source and water is 1:(0.0005-0.05):(0.01-0.3):(0.05-1.4):(0-0.5):(5-100), preferably 1:(0.005-0.04):(0.05-0.2):(0.2-1.0):(0-0.3):(10-40), the crystallization conditions include: a crystallization temperature of 140-180 degrees Celsius, preferably 145-170 degrees Celsius, a crystallization duration of 1-6 days, preferably 2-5 days, and the calcination conditions include: a calcination temperature of 300-800 degrees Celsius, preferably 400-650 degrees Celsius, a calcination duration of 1-10 h, preferably 3-6 h.

10. A molecular sieve composition, comprising the molecular sieve according to any one of the preceding aspects or the molecular sieve produced in line with the process according to any one of the preceding aspects, and a binder.

11. Use of the molecular sieve according to any one of the preceding aspects, the molecular sieve produced in line with the process according to any one of the preceding aspects or the molecular sieve composition according to any one of the preceding aspects as an adsorbent, an alkylation catalyst, an olefin hydration catalyst, an olefin oxidation catalyst, a hydrocracking catalyst or an olefin isomerization catalyst.

FIGURE DESCRIPTION

FIG. 1 illustrates the X ray diffraction (XRD) pattern of the SCM-1 molecular sieve produced in Example I-1 and MCM-22 molecular sieve produced in Comparative Example I-1. According to FIG. 1, there are obvious diffraction peaks at the d-spacing values of 21.04 Å and 9.10 Å respectively in the XRD pattern of the SCM-1 molecular sieve as compared with that of the MCM-22 molecular sieve, while there is not any diffraction peaks at the d-spacing value of 30.00 Å, 8.83 Å, 6.00 Å, 4.92 Å, 4.64 Å, 3.20 Å, 3.10 Å or 3.00 Å, and there are overlapping diffraction peaks across the d-spacing value range of from 4.20 Å to 3.67 Å.

Figure 2:
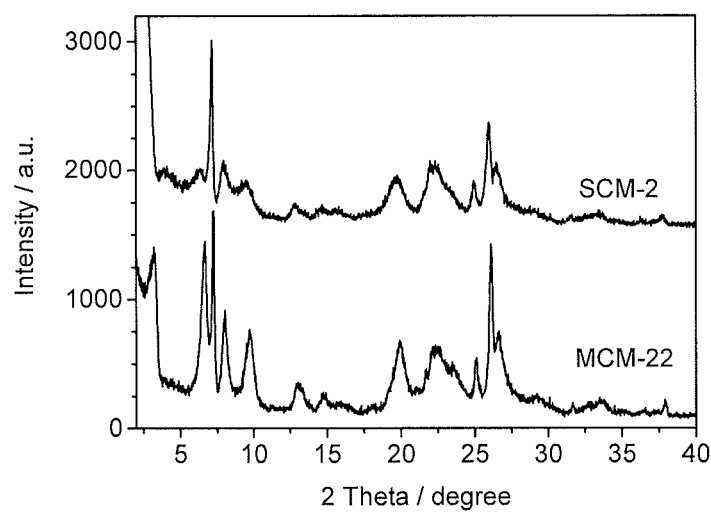

FIG. 2 illustrates the X ray diffraction (XRD) pattern of the SCM-2 molecular sieve produced in Example II-1 and MCM-22 molecular sieve produced in Comparative Example II-1. According to FIG. 2, in the XRD pattern of the SCM-2 molecular sieve, as compared with that of the MCM-22 molecular sieve, there are obvious diffraction peaks at the d-spacing values of 13.84 Å and 9.27 Å, while there is not any diffraction peaks at the d-spacing value of 30.00 Å, 6.00 Å, 4.92 Å, 4.64 Å, 3.20 Å, 3.10 Å or 3.00 Å.

Figure 3A:
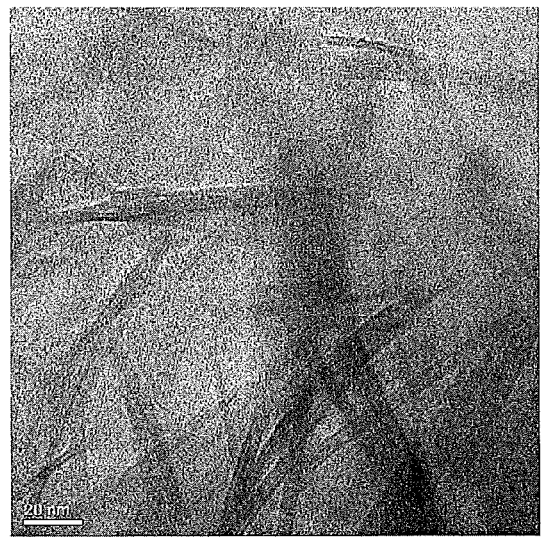
Figure 3B:
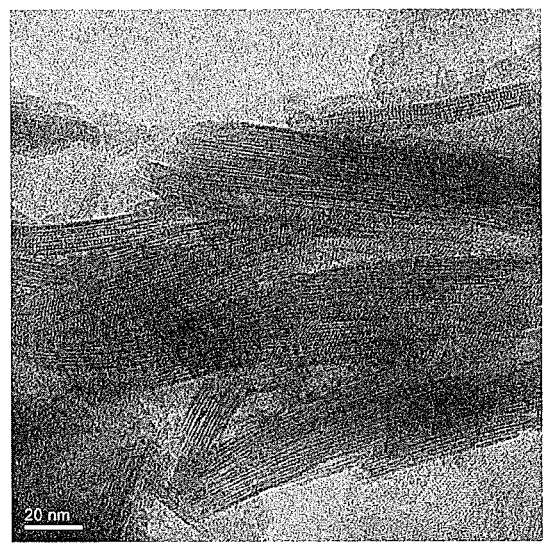

FIG. 3a illustrates the cross-section TEM image of a flake crystal of the SCM-1 molecular sieve produced in Example I-1, wherein the face having the smallest size of the flake crystal was observed for an easy measurement of the thickness of the flake crystal; FIG. 3b illustrates the cross-section TEM image of a flake crystal of the MCM-22 molecular sieve produced in Comparative Example I-1, wherein the face having the smallest size of the flake crystal was observed for an easy measurement of the thickness of the flake crystal. According to FIG. 3a, the SCM-1 molecular sieve is made of two elementary building layer structures, each having a typical MWW topological structure, with a thickness of only about 5 nm in total. According to FIG. 3b, the MCM-22 molecular sieve has multi-layered structure, with a layer number of more than 5 and a thickness of about 20 nm in total.

TECHNICAL EFFECTS

The molecular sieve according to this invention has the MWW topological structure, but is significantly different from a MCM-22 molecular sieve or an ITQ-2 molecular sieve in terms of layer structure, as illustrated by its specific XRD diffraction pattern.

The molecular sieve according to this invention, has a specific "dual" elementary building layer structure, which exposes as much as possible the twelve-membered ring semi-supercages of the MWW topological structure, and at the same time, retains the ten-membered ring pores comprising cylindrical twelve-membered ring supercages between different layers, whereby exhibiting in a catalytic reaction both a high reactant converting capability (i.e. a high reactant conversion), and a high product selectivity and a good stability.

The molecular sieve according to this invention, even for a severely diffusion-restricted reaction (for example, the Beckmann rearrangement reaction of cyclohexanone oxime), still exhibits at least comparable or even better reactant converting capability as compared with an ITQ-2 molecular sieve.

The molecular sieve according to this invention, has a stable framework structure, and is robust in the resistance to carbon deposition, i.e. less tendency to carbon deposition in a catalytic reaction, whereby having significantly elongated service life as compared with an ITQ-2 molecular sieve.

The molecular sieve according to this invention, can be regenerated by calcination at elevated temperatures after losing activity, and its catalytic performances can be easily recovered to the same level of a fresh catalyst by this regeneration, whereby exhibiting desirable regeneration performance or recycling performance.

The process for producing a molecular sieve according to this invention, is characterized by simplified production procedure, ready availability of the starting materials, fewer numbers of operation step, mild operation conditions, and thus less energy and material consumption, and therefore is much suitable for industrial application.

The process for producing a molecular sieve according to this invention, is characterized by fewer numbers of operation step and less loss of material, resulting in a molecular sieve yield of more than 80%, preferably 90% or more, or even about 100%.

The process for producing a molecular sieve according to this invention, is characterized by a simple crystallization system, mild crystallization conditions, a simple and controllable crystallization procedure, such that an aimed molecular sieve product with a relatively higher purity can be obtained without the worry of harmful impurities.

The molecular sieve according to this invention, when observed with transmission electron microscope (TEM), presents as flake crystals having an even thickness (with an average thickness of about 5 nm) with a very low non-crystal (as impurities) content (preferably 10% or less, even 1% or less) thus an extremely high crystal purity, whereby facilitating a full development of its catalytic performances.

In the molecular sieve according to this invention, the external specific surface area accounts for not less than 40% of the total specific surface area, which is significantly higher than the case of a MCM-22 molecular sieve (generally about 20%), whereby exhibiting a significantly superior reactant converting capability over a MCM-22 molecular sieve.

The molecular sieve according to this invention, shows a desirable acid catalyzing capability with superior catalytic performances, especially for an alkylation reaction in liquid phase of benzene and ethylene or an alkylation reaction in liquid phase of benzene and propylene.

The molecular sieve according to this invention, when used in catalyzing an alkylation reaction of benzene, only a relatively lowered reaction temperature is needed with a high reactant conversion and a high product selectivity, with a stable operation.

SPECIFIC MODE TO CARRY OUT THIS INVENTION

This invention will be described in details hereinafter with reference to the following specific embodiments. However, it should be noted that the protection scope of this invention should not be construed as limited to these specific embodiments, but rather determined by the attached claims.

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention.

Further, to the extent that any meaning or definition of a term in this document conflicts with any meaning or definition of the same term in a document incorporated by reference, the meaning or definition assigned to that term in this document shall govern.

In the context of this specification, the term "halo" or the like refers to fluoro, chloro, bromo or iodo.

In the context of this specification, as a $C_{1-4}$ linear or branched alkyl, there may be exemplified methyl, ethyl or propyl, while as a $C_{2-4}$ linear or branched alkenyl, there may be exemplified vinyl, allyl or propenyl.

In the context of this specification, a molecular sieve, before any other material (for example, organic templates, or halogen) than water and metal ions that has been filled into its pores during the production thereof is removed from the pores, is referred to as "precursor".

In the context of this specification, by total specific surface area, it refers to the total area per unit of mass of a sample, including the internal surface area and the external surface area. A non-porous material has only external surface area, like Portland cement or some clay mineral powder, while a porous material has the external surface area and the internal surface area, like asbestos fiber, diatomite or molecular sieves. In a porous material, the surface area of pores having a diameter of less than 2 nm is referred to as internal surface area, while the surface area obtained by subtracting the internal surface area from the total surface area is referred to as external surface area. The external surface area per unit of mass of a sample is referred to as external specific surface area.

In the context of this specification, by pore volume, it refers to the volume of pores per unit of mass of a porous material (e.g. a molecular sieve). By total pore volume, it refers to the volume of all pores (generally involving only pores having a pore diameter of less than 50 nm) per unit of mass of a molecular sieve. By micropore volume, it refers to the volume of all micropores (generally referred to pores having a pore diameter of less than 2 nm) per unit of mass of a molecular sieve.

In the context of this specification, in the XRD data of the molecular sieve, w, m, s, vs indicate the intensity of a diffraction peak, with w referring to weak, m to medium, s to strong, vs to very strong, which has been well known in this field. In general, w represents a value of less than 20; m represents a value of 20-40; s represents a value of 40-70; vs represents a value of greater than 70.

Unless otherwise specified, percents, parts or ratios or the like mentioned in this specification are all on a weight basis.

According to a first embodiment of this invention, related to is a SCM-1 molecular sieve. This SCM-1 molecular sieve has an empirical chemical composition as illustrated by the formula "a first oxide·a second oxide". It is known that, a molecular sieve will sometimes (especially immediately after the production thereof) contain a certain amount of water, however, this invention does not specify or identify as to how much this amount may be, since the presence or absence of water will not substantially change the XRD pattern of the present molecular sieve. In this context, the empirical chemical composition actually represents an anhydrous chemical composition of this molecular sieve. Further, it is obvious that the empirical chemical composition represents the framework chemical composition of the SCM-1 molecular sieve.

According to the first embodiment of this invention, in the SCM-1 molecular sieve, the ratio by molar of the first oxide to the second oxide is a generally 20-2000, preferably 25-200.

According to the first embodiment of this invention, in the SCM-1 molecular sieve, the first oxide is one or more selected from the group consisting of silica ($SiO_2$) and germanic oxide, wherein preference is given to silica.

According to the first embodiment of this invention, in the SCM-1 molecular sieve, the second oxide is one or more selected from the group consisting of alumina ($Al_2O_3$), boron oxide, iron oxide, gallium oxide, titanium oxide, rare earth oxides, indium oxide and vanadium oxide, wherein preference is given to alumina.

According to the first embodiment of this invention, the SCM-1 molecular sieve has a X ray diffraction pattern as substantially illustrated in the following table.

| 2θ (°) | d-spacing (Å) | relative intensity ($I/I_0 \times 100$) |
| --- | --- | --- |
| 4.22 ± 0.30 | 21.04 ± 1.48 | w-s |
| 7.17 ± 0.18 | 12.32 ± 0.31 | vs |
| 7.99 ± 0.20 | 11.07 ± 0.28 | m-s |
| 9.71 ± 0.13 | 9.10 ± 0.12 | m-s |
| 14.37 ± 0.14 | 6.16 ± 0.06 | m-s |
| 22.67 ± 0.29 | 3.92 ± 0.05 | w-m |
| 26.03 ± 0.23 | 3.42 ± 0.03 | s |

According to the first embodiment of this invention, the X ray diffraction pattern of the SCM-1 molecular sieve preferably further includes X-ray diffraction peaks as substantially illustrated in the following table.

| 2θ (°) | d-spacing (Å) | relative intensity ($I/I_0 \times 100$) |
| --- | --- | --- |
| 12.86 ± 0.19 | 6.88 ± 0.10 | w |
| 15.90 ± 0.14 | 5.57 ± 0.05 | w |

-continued

| 2θ (°) | d-spacing (Å) | relative intensity (I/I₀ × 100) |
|---|---|---|
| 20.26 ± 0.23 | 4.38 ± 0.05 | w |
| 21.93 ± 0.38 | 4.05 ± 0.07 | m |
| 23.65 ± 0.32 | 3.76 ± 0.05 | w |
| 25.07 ± 0.29 | 3.55 ± 0.04 | w |
| 26.92 ± 0.25 | 3.31 ± 0.03 | w |

According to the first embodiment of this invention, the SCM-1 molecular sieve has a novel crystalline structure completely different and distinct from that of many other materials (especially a MCM-22 molecular sieve) and some multi-layered materials. As illustrated by its XRD pattern, as aforesaid, in the XRD pattern of the SCM-1 molecular sieve, there are obvious diffraction peaks at the d-spacing values around 21.04 Å and 9.10 Å, while there is not any diffraction peaks at the d-spacing value around 30.00 Å, 8.83 Å, 6.00 Å, 4.92 Å, 4.64 Å, 3.20 Å, 3.14 Å or 2.99 Å, and there are overlapping diffraction peaks across the d-spacing value range of from 4.20 Å to 3.67 Å.

According to the first embodiment of this invention, the total pore volume of the SCM-1 molecular sieve is generally not less than 0.5 cm$^3$/g, preferably 0.55-0.90 cm$^3$/g, wherein the micropore volume is generally not less than 0.06 cm$^3$/g, preferably 0.08-0.20 cm$^3$/g.

According to the first embodiment of this invention, the total specific surface area of the SCM-1 molecular sieve is generally not less than 450 m$^2$/g, preferably 480-680 m$^2$/g.

According to the first embodiment of this invention, the external specific surface area of the SCM-1 molecular sieve is generally not less than 185 m$^2$/g, preferably 200-400 m$^2$/g, and the external specific surface area accounts for generally not less than 40%, preferably 45-65% of the total specific surface area.

According to the first embodiment of this invention, as illustrated by its XRD pattern, the SCM-1 molecular sieve has a MWW topological framework structure.

According to the first embodiment of this invention, if observed with transmission electron microscope (TEM), at least 80%, preferably at least 85%, more preferably at least 90%, more preferably at least 95%, more preferably at least 99% of all crystals of the SCM-1 molecular sieve are flake crystals having a thickness of about 5 nm (for example, 5±0.8 nm), whereby presenting as a nearly pure crystalline molecular sieve. Accordingly, in the SCM-1 molecular sieve, non-crystals (as impurities) are contained at a much lower content, for example, with a non-crystal content of generally 20% or less, preferably 15% or less, more preferably 10% or less, more preferably 5% or less, further preferably 1% or less.

According to a second embodiment of this invention, related to is a SCM-2 molecular sieve. The SCM-2 molecular sieve has an empirical chemical composition (or a framework chemical composition) as illustrated by the formula "a first oxide·a second oxide". In general, immediately after the production thereof, the SCM-2 molecular sieve may further contain an organic template and water in its composition (generally contained or filled in the pores). In this context, the SCM-2 molecular sieve may generally have an empirical chemical composition as illustrated by the formula "a first oxide·a second oxide·an organic template·water".

According to the second embodiment of this invention, in the SCM-2 molecular sieve, the ratio by molar of the first oxide to the second oxide is generally 20-2000, preferably 25-200.

According to the second embodiment of this invention, in the SCM-2 molecular sieve, the ratio by weight of the organic template to the first oxide is generally 0.03-0.38, preferably 0.07-0.27.

According to the second embodiment of this invention, in the SCM-2 molecular sieve, the ratio by weight of water to the first oxide is generally 0-0.15, preferably 0.02-0.11.

According to the second embodiment of this invention, in the SCM-2 molecular sieve, the first oxide is one or more selected from the group consisting of silica and germanic oxide, wherein preference is given to silica.

According to the second embodiment of this invention, in the SCM-2 molecular sieve, the second oxide is one or more selected from the group consisting of alumina, boron oxide, iron oxide, gallium oxide, titanium oxide, rare earth oxides, indium oxide and vanadium oxide, wherein preference is given to alumina.

According to the second embodiment of this invention, the SCM-2 molecular sieve has an X ray diffraction pattern as substantially illustrated in the following table.

| 2θ (°) | d-spacing (Å) | relative intensity (I/I₀ × 100) |
|---|---|---|
| 6.38 ± 0.14 | 13.84 ± 0.30 | w |
| 7.15 ± 0.13 | 12.36 ± 0.22 | vs |
| 7.94 ± 0.12 | 11.13 ± 0.17 | m |
| 9.54 ± 0.13 | 9.27 ± 0.13 | w-m |
| 21.98 ± 0.17 | 4.04 ± 0.03 | m |
| 25.96 ± 0.15 | 3.43 ± 0.02 | m-s |
| 26.43 ± 0.16 | 3.37 ± 0.02 | m |

According to the second embodiment of this invention, the X ray diffraction pattern of the SCM-2 molecular sieve preferably further includes X-ray diffraction peaks as substantially illustrated in the following table.

| 2θ (°) | d-spacing (Å) | relative intensity (I/I₀ × 100) |
|---|---|---|
| 3.87 ± 0.20 | 22.90 ± 1.21 | w |
| 12.79 ± 0.20 | 6.92 ± 0.11 | w |
| 19.76 ± 0.31 | 4.49 ± 0.07 | w-m |
| 22.55 ± 0.23 | 3.94 ± 0.04 | w-m |
| 24.92 ± 0.14 | 3.57 ± 0.02 | w |

According to the second embodiment of this invention, the SCM-2 molecular sieve has a novel crystalline structure completely different and distinct from that of many other materials (especially a MCM-22 molecular sieve) and some multi-layered materials. As illustrated by the XRD pattern, as aforesaid, in the XRD pattern of the SCM-2 molecular sieve, there are obvious diffraction peaks at the d-spacing values around 13.84 Å and 9.27 Å, while there is not any diffraction peaks at the d-spacing value around 30.00 Å, 8.83 Å, 6.00 Å, 5.54 Å, 4.92 Å, 4.25 Å, 3.75 Å, 3.20 Å or 3.14 Å.

According to the second embodiment of this invention, the total pore volume of the SCM-2 molecular sieve is generally not less than 0.5 cm$^3$/g, preferably 0.55-0.90 cm$^3$/g, wherein the micropore volume is generally not less than 0.06 cm$^3$/g, preferably 0.08-0.20 cm$^3$/g.

According to the second embodiment of this invention, the total specific surface area of the SCM-2 molecular sieve is generally not less than 450 m$^2$/g, preferably 480-680 m$^2$/g.

According to the second embodiment of this invention, the external specific surface area of the SCM-2 molecular sieve is generally not less than 185 m$^2$/g, preferably 200-400 m²/g, and the external specific surface area accounts for generally not less than 40%, preferably 45-65% of the total specific surface area.

According to the second embodiment of this invention, as the organic template, there may be exemplified those hereinafter described in connection with the process for producing a molecular sieve according to this invention. Specifically, the organic template is generally the combination of a first organic template and a second organic template.

According to this invention, in the combination, the ratio by molar of the first organic template to the second organic template is generally 0.1-5.0, preferably 0.3-3.5, more preferably 0.4-1.5.

According to this invention, the first organic template may be an aza monocyclic cycloalkane. By "aza monocyclic cycloalkane", it is to be understood in a conventional manner in the organic chemistry, for example, and may refer to a compound obtained by replacing a carbon atom on the ring of the monocyclic cycloalkane by a nitrogen atom, more specifically, monoaza cyclohexane (piperidine) or 1,4-diaza cycloheptane (homopiperazine). As the aza monocyclic cycloalkane, there may be exemplified a monoaza, diaza or triaza monocyclic cycloalkane. As the cycloalkane, there may be exemplified a $C_{5-15}$ cycloalkane, wherein preference is given to a $C_{6-10}$ cycloalkane, specifically for example, cyclohexane, cycloheptane, cyclooctane, cyclononane and cyclodecane. Further, on each carbon atom constituting the ring skeleton of the aza monocyclic cycloalkane, there may further optionally exist a substituent selected from the group consisting of a $C_{1-4}$ linear or branched alkyl and a $C_{2-4}$ linear or branched alkenyl. As the aza monocyclic cycloalkane, one kind or a mixture of two or more kinds at any ratio therebetween could be used.

According to this invention, as the aza monocyclic cycloalkane, there may be further exemplified a saturated monocyclic compound whose ring skeleton is made of

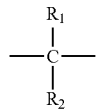

(with the number of n in total) and

(with the number of m in total). Herein, $R_1$ and $R_2$ may be identical to or different from one another, each independently selected from the group consisting of hydrogen, a $C_{1-4}$ linear or branched alkyl and a $C_{2-4}$ linear or branched alkenyl, preferably each independently selected from the group consisting of hydrogen and methyl, most preferably hydrogen, and $R_3$ represents hydrogen. The numerical value n represents an integer of from 4 to 12, preferably an integer of from 5 to 8. The numerical value m represents an integer of from 1 to 3, preferably 1 or 2. As the saturated monocyclic compound, one kind or a mixture of two or more kinds at any ratio therebetween could be used.

According to a preferred embodiment of this invention, in the aza monocyclic cycloalkane or the saturated monocyclic compound, the ratio of the total number of the carbon atoms constituting the ring skeleton (i.e. not including the carbon atom of the substituent (for example, the aforesaid $R_1$ and $R_2$), if any) to the total number of the nitrogen atoms constituting the ring skeleton (i.e. the C/N ratio) is generally greater than 2, preferably 2.5 or more.

According to this invention, as the first organic template, specifically there may be exemplified hexamethyleneimine (having a C/N ratio of 6), piperidine (having a C/N ratio of 5), 2-methyl piperidine (having a C/N ratio of 5) and homopiperazine (having a C/N ratio of 2.5).

According to this invention, the second organic template is one or more selected from the group consisting of an aza arene and a compound represented by the following formula (I).

According to this invention, in the formula (I), $R_4$, $R_5$ and $R_6$ may be identical to or different from one another, each independently selected from the group consisting of hydrogen, a $C_{1-12}$ linear or branched alkyl, a $C_{2-12}$ linear or branched alkenyl, a $C_{5-12}$ monocyclic cycloalkyl and a $C_{5-12}$ monocyclic cycloalkenyl. As the $C_{1-12}$ linear or branched alkyl, there may be exemplified a $C_{1-10}$ linear or branched alkyl, a $C_{1-6}$ linear or branched alkyl or a $C_{1-4}$ linear or branched alkyl, specifically there may be exemplified methyl, ethyl, propyl and butyl. As the $C_{2-12}$ linear or branched alkenyl, there may be exemplified a $C_{2-10}$ linear or branched alkenyl, a $C_{2-6}$ linear or branched alkenyl or a $C_{2-4}$ linear or branched alkenyl, specifically there may be exemplified vinyl, propenyl, allyl and butenyl. As the $C_{5-12}$ monocyclic cycloalkyl, there may be exemplified a $C_{6-10}$ monocyclic cycloalkyl or a $C_{6-8}$ monocyclic cycloalkyl, specifically there may be exemplified cyclopentyl, cyclohexyl, cycloheptyl, cyclooctyl, cyclononyl and cyclodecyl, wherein preference is given to cyclohexyl and cycloheptyl. The monocyclic cycloalkyl may further optionally carry one or more (for example, from 1 to 5, from 1 to 3 or 1) substituent selected from the group consisting of a $C_{1-4}$ linear or branched alkyl and a $C_{2-4}$ linear or branched alkenyl. As the $C_{5-12}$ monocyclic cycloalkenyl, there may be exemplified a $C_{6-10}$ monocyclic cycloalkenyl or a $C_{6-8}$ monocyclic cycloalkenyl, specifically there may be exemplified cyclopentenyl, cyclopentadienyl, cyclohexenyl, cyclohexadienyl, cycloheptenyl, cycloheptatrienyl, cyclooctenyl, cyclooctatetraenyl, cyclononenyl and cyclodecenyl. The monocyclic cycloalkenyl may further optionally carry one or more (for example, from 1 to 5, from 1 to 3 or 1) substituent selected from the group consisting of a $C_{1-4}$ linear or branched alkyl and a $C_{2-4}$ linear or branched alkenyl.

According to this invention, in the formula (I), Requirement (1) is that one at most out of $R_4$, $R_5$ and $R_6$ represents hydrogen, and Requirement (2) is that at least one (preferably at least two) out of $R_4$, $R_5$ and $R_6$ is selected from the $C_{5-12}$ monocyclic cycloalkyl and the $C_{5-12}$ monocyclic cycloalkenyl. As the Requirement (2), it is more preferable that at least one (preferably at least two) out of $R_4$, $R_5$ and $R_6$ is the $C_{5-12}$ monocyclic cycloalkyl.

According to a preferred embodiment of this invention, in the compound represented by the formula (I), the ratio of the total number of the carbon atoms (not including the carbon atom of the substituent, if any) to the total number of the nitrogen atoms (i.e. the C/N ratio) is generally 10 or more, 12 or more or 13 or more.

According to this invention, as the compound represented by the formula (I), specifically there may be exemplified N,N-diethyl cyclohexylamine (having a C/N ratio of 10), dicyclohexylamine (having a C/N ratio of 12) and N-methyl dicyclohexylamine (having a C/N ratio of 13).

According to this invention, as the compound represented by the formula (I), one kind or a mixture of two or more kinds at any ratio therebetween could be used.

According to this invention, by "aza arene", it is to be understood in a conventional manner in the organic chemistry, and for example, may refer to a compound obtained by replacing a carbon atom on the ring of an arene by a nitrogen atom, specifically, monoaza benzene (pyridine) or monoaza naphthalene (quinoline or isoquinoline). As the aza arene, there may be exemplified a monoaza, diaza or triaza arene. As the arene, there may be exemplified a $C_{6-20}$ arene, wherein preference is given to a $C_{6-14}$ arene, especially benzene, naphthalene, anthracene and phenanthrene. On each carbon atom constituting the ring skeleton of the aza arene, there may further optionally exist a substituent selected from the group consisting of a $C_{1-4}$ linear or branched alkyl and a $C_{2-4}$ linear or branched alkenyl (hereinafter referred to as substituent A). Further, on each nitrogen atom constituting the ring skeleton of the aza arene, there may further optionally exist a (one) substituent selected from the group consisting of a $C_{1-12}$ linear or branched alkyl, a $C_{2-12}$ linear or branched alkenyl, a $C_{5-12}$ monocyclic cycloalkyl, a $C_{5-12}$ monocyclic cycloalkenyl and a $C_{6-20}$ aryl (referred to as substituent B). As the $C_{1-12}$ linear or branched alkyl, there may be exemplified a $C_{1-10}$ linear or branched alkyl, a $C_{1-6}$ linear or branched alkyl or a $C_{1-4}$ linear or branched alkyl, specifically there may be exemplified methyl, ethyl, propyl and butyl. As the $C_{2-12}$ linear or branched alkenyl, there may be exemplified a $C_{2-10}$ linear or branched alkenyl, a $C_{2-6}$ linear or branched alkenyl or a $C_{2-4}$ linear or branched alkenyl, specifically there may be exemplified vinyl, propenyl, allyl and butenyl. As the $C_{5-12}$ monocyclic cycloalkyl, there may be exemplified a $C_{6-10}$ monocyclic cycloalkyl or a $C_{6-5}$ monocyclic cycloalkyl, specifically there may be exemplified cyclopentyl, cyclohexyl, cycloheptyl, cyclooctyl, cyclononyl and cyclodecyl, wherein preference is given to cyclohexyl and cycloheptyl. The monocyclic cycloalkyl may further optionally carry one or more (for example, from 1 to 5, from 1 to 3 or 1) substituent selected from the group consisting of a $C_{1-4}$ linear or branched alkyl and a $C_{2-4}$ linear or branched alkenyl (hereinafter referred to as substituent A). As the $C_{5-12}$ monocyclic cycloalkenyl, there may be exemplified a $C_{6-10}$ monocyclic cycloalkenyl or a $C_{6-8}$ monocyclic cycloalkenyl, specifically there may be exemplified cyclopentenyl, cyclopentadienyl, cyclohexenyl, cyclohexadienyl, cycloheptenyl, cycloheptatrienyl, cyclooctenyl, cyclooctatetraenyl, cyclononenyl and cyclodecenyl. The monocyclic cycloalkenyl may further optionally carry one or more (for example, from 1 to 5, from 1 to 3 or 1) substituent selected from the group consisting of a $C_{1-4}$ linear or branched alkyl and a $C_{2-4}$ linear or branched alkenyl (hereinafter referred to as substituent A). As the $C_{6-20}$ aryl, there may be exemplified a $C_{6-14}$ aryl or a $C_{6-10}$ aryl, specifically there may be exemplified phenyl, naphtyl, anthracenyl and phenanthrenyl. The aryl may further optionally carry one or more (for example, from 1 to 5, from 1 to 3 or 1) substituent selected from the group consisting of a $C_{1-4}$ linear or branched alkyl and a $C_{2-4}$ linear or branched alkenyl (hereinafter referred to as substituent A).

According to a preferred embodiment of this invention, in the aza arene, the ratio of the total number of the carbon atoms (not including the carbon atom of the substituent A (if any) but including that of the substituent B (if any)) to the total number of the nitrogen atoms (i.e. the C/N ratio) is generally 9 or more, 10 or more or 11 or more.

According to this invention, as the aza arene, specifically there may be exemplified quinoline (having a C/N ratio of 9), N-phenyl quinoline (having a C/N ratio of 15), N-cyclohexyl pyridine (having a C/N ratio of 11) and 6-methyl quinoline (having a C/N ratio of 9).

According to this invention, as the aza arene, one kind or a mixture of two or more kinds at any ratio therebetween could be used.

According to the second embodiment of this invention, as illustrated by its XRD pattern, the SCM-2 molecular sieve has a MWW topological framework structure.

According to the second embodiment of this invention, if observed with transmission electron microscope (TEM), at least 80%, preferably at least 85%, more preferably at least 90%, more preferably at least 95%, more preferably at least 99% of all crystals of the SCM-2 molecular sieve are flake crystals having a thickness of about 5 nm (for example, 5±0.8 nm), whereby presenting as a nearly pure crystalline molecular sieve.

According to the second embodiment of this invention, the SCM-2 molecular sieve may be calcinated to remove any organic template and water filled in the pores, whereby obtaining the SCM-1 molecular sieve of the first embodiment. Herein, the calcination may be conducted in any manner conventionally known in this field, for example, the calcination temperature is generally 300-800 degrees Celsius, preferably 400-650 degrees Celsius, while the calcination duration is generally 1-10 h, preferably 3-6 h. Further, the calcination is generally conducted under an oxygen containing atmosphere, for example, under the air atmosphere or under oxygen atmosphere.

According to this invention, depending on the starting materials to be used for the production, the SCM-1 molecular sieve or the SCM-2 molecular sieve in its composition may further contain metal cations like alkali metal and/or alkaline earth metal cations as a component, generally contained or filled in the pores. The content of the metal cation is such that, for example, the ratio by weight of the metal cation to the first oxide is generally 0-0.02, preferably 0.0002-0.006, but not limiting thereto.

According to this invention, depending on the starting materials to be used for the production, the SCM-1 molecular sieve or the SCM-2 molecular sieve may further contain halogen in its composition as a component, generally contained or filled in the pores. The content of the halogen may be such that, for example, the ratio by weight of the halogen to the first oxide is generally 0-0.15, preferably 0-0.03, but not limiting thereto.

According to this invention, the SCM-1 molecular sieve or the SCM-2 molecular sieve may be produced in line with the following process. In view of this, this invention further relates to a process for producing a molecular sieve, which includes a step of under crystallization conditions, contacting a first oxide source, a second oxide source, an alkali source, an organic template and water (hereinafter referred to as contacting step).

According to this invention, in the process, the contacting step may be conducted in any manner conventionally known in this field, there may be exemplified a method wherein the first oxide source, the second oxide source, the alkali source, the organic template and water are mixed, and then the mixture is crystallized under crystallization conditions.

According to this invention, in the process, as the first oxide source, any oxide source conventionally used in this field for this purpose can be used. For example, when the first oxide is silica, as the first oxide source, there may be exemplified silicic acid, silica gel, silica sol, potassium silicate, water glass or tetralkoxysilane.

When the first oxide is germanic oxide, as the first oxide source, there may be exemplified tetralkoxy germanium, germanium dioxide, germanium nitrate. As the first oxide source, one kind or a mixture of two or more kinds at any ratio therebetween could be used.

According to this invention, in the process, as the second oxide source, any oxide source conventionally used in this field for this purpose can be used, including but not limiting to corresponding oxides, hydroxides, alkoxides, oxometallates, acetates, oxalates, ammonium salts, sulfates, halides and nitrates of the metal in the second oxide. For example, when the second oxide is alumina, as the second oxide source, there may be exemplified aluminium hydroxide, sodium aluminate, aluminium salts, kaolin or montmorillonite. When the second oxide is boron oxide, as the second oxide source, there may be exemplified boric acid, borate salt, borax, $B_2O_3$. When the second oxide is iron oxide, as the second oxide source, there may be exemplified ferric nitrate, ferric chloride, ferric oxide. When the second oxide is gallium oxide, as the second oxide source, there may be exemplified gallium nitrate, gallium sulfate, gallium oxide. When the second oxide is titanium oxide, as the second oxide source, there may be exemplified titanium tetralkoxide, titania, titanium nitrate. When the second oxide is rare earth oxide, as the second oxide source, there may be exemplified lanthanum oxide, neodymium oxide, yttrium oxide, cerium oxide, lanthanum nitrate, neodymium nitrate, yttrium nitrate, ceric ammonium sulfate. When the second oxide is indium oxide, as the second oxide source, there may be exemplified indium chloride, indium nitrate, indium oxide. When the second oxide is vanadium oxide, as the second oxide source, there may be exemplified vanadium chloride, ammonium metavanadate, sodium vanadate, vanadium dioxide, vanadyl sulfate. As the second oxide source, one kind or a mixture of two or more kinds at any ratio therebetween could be used.

According to this invention, in the process, as the alkali source, any alkali source conventionally used in this field for this purpose can be used, including but not limiting to an inorganic alkali containing an alkali metal or alkaline earth metal as the cation, especially NaOH and KOH. As the alkali source, one kind or a mixture of two or more kinds at any ratio therebetween could be used.

According to this invention, in the process, the organic template may be the combination of a first organic template and a second organic template.

According to this invention, in the combination, the ratio by molar of the first organic template to the second organic template is generally 0.1-5.0, preferably 0.3-3.5, more preferably 0.4-1.5.

According to this invention, the first organic template may be an aza monocyclic cycloalkane. By "aza monocyclic cycloalkane", it is to be understood in a conventional manner in the organic chemistry, for example, and may refer to a compound obtained by replacing a carbon atom on the ring of the monocyclic cycloalkane by a nitrogen atom, more specifically, monoaza cyclohexane (piperidine) or 1,4-diaza cycloheptane (homopiperazine). As the aza monocyclic cycloalkane, there may be exemplified a monoaza, diaza or triaza monocyclic cycloalkane. As the cycloalkane, there may be exemplified a $C_{5-15}$ cycloalkane, wherein preference is given to a $C_{6-10}$ cycloalkane, specifically for example, cyclohexane, cycloheptane, cyclooctane, cyclononane and cyclodecane. Further, on each carbon atom constituting the ring skeleton of the aza monocyclic cycloalkane, there may further optionally exist a substituent selected from the group consisting of a $C_{1-4}$ linear or branched alkyl and a $C_{2-4}$ linear or branched alkenyl. As the aza monocyclic cycloalkane, one kind or a mixture of two or more kinds at any ratio therebetween could be used.

According to this invention, as the aza monocyclic cycloalkane, there may be further exemplified a saturated monocyclic compound whose ring skeleton is made of

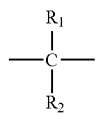

(with the number of n in total) and

(with the number of m in total). Herein, $R_1$ and $R_2$ may be identical to or different from one another, each independently selected from the group consisting of hydrogen, a $C_{1-4}$ linear or branched alkyl and a $C_{2-4}$ linear or branched alkenyl, preferably each independently selected from the group consisting of hydrogen and methyl, most preferably hydrogen, and $R_3$ represents hydrogen. The numerical value n represents an integer of from 4 to 12, preferably an integer of from 5 to 8. The numerical value m represents an integer of from 1 to 3, preferably 1 or 2. As the saturated monocyclic compound, one kind or a mixture of two or more kinds at any ratio therebetween could be used.

According to a preferred embodiment of this invention, in the aza monocyclic cycloalkane or the saturated monocyclic compound, the ratio of the total number of the carbon atoms constituting the ring skeleton (i.e. not including the carbon atom of the substituent (for example, the aforesaid $R_1$ and $R_2$), if any) to the total number of the nitrogen atoms constituting the ring skeleton (i.e. the C/N ratio) is generally greater than 2, preferably 2.5 or more.

According to this invention, as the first organic template, specifically there may be exemplified hexamethylene imine (having a C/N ratio of 6), piperidine (having a C/N ratio of 5), 2-methyl piperidine (having a C/N ratio of 5) and homopiperazine (having a C/N ratio of 2.5).

According to this invention, the second organic template is one or more selected from the group consisting of an aza arene and a compound represented by the following formula (I).

(I)

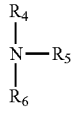

According to this invention, in the formula (I), $R_4$, $R_5$ and $R_6$ may be identical to or different from one another, each independently selected from the group consisting of hydrogen, a $C_{1-12}$ linear or branched alkyl, a $C_{2-12}$ linear or branched alkenyl, a $C_{5-12}$ monocyclic cycloalkyl and a $C_{5-12}$ monocyclic cycloalkenyl. As the $C_{1-12}$ linear or branched alkyl, there may be exemplified a $C_{1-10}$ linear or branched alkyl, a $C_{1-6}$ linear or branched alkyl or a $C_{1-4}$ linear or branched alkyl, specifically there may be exemplified methyl, ethyl, propyl and butyl. As the $C_{2-12}$ linear or branched alkenyl, there may be exemplified a $C_{2-10}$ linear or branched alkenyl, a $C_{2-6}$ linear or branched alkenyl or a $C_{2-4}$ linear or branched alkenyl, specifically there may be exemplified vinyl, propenyl, allyl and butenyl. As the $C_{5-12}$ monocyclic cycloalkyl, there may be exemplified a $C_{6-10}$ monocyclic cycloalkyl or a $C_{6-8}$ monocyclic cycloalkyl, specifically there may be exemplified cyclopentyl, cyclohexyl, cycloheptyl, cyclooctyl, cyclononyl and cyclodecyl, wherein preference is given to cyclohexyl and cycloheptyl. The monocyclic cycloalkyl may further optionally carry one or more (for example, from 1 to 5, from 1 to 3 or 1) substituent selected from the group consisting of a $C_{1-4}$ linear or branched alkyl and a $C_{2-4}$ linear or branched alkenyl. As the $C_{5-12}$ monocyclic cycloalkenyl, there may be exemplified a $C_{6-10}$ monocyclic cycloalkenyl or a $C_{6-8}$ monocyclic cycloalkenyl, specifically there may be exemplified cyclopentenyl, cyclopentadienyl, cyclohexenyl, cyclohexadienyl, cycloheptenyl, cycloheptatrienyl, cyclooctenyl, cyclooctatetraenyl, cyclononenyl and cyclodecenyl. The monocyclic cycloalkenyl may further optionally carry one or more (for example, from 1 to 5, from 1 to 3 or 1) substituent selected from the group consisting of a $C_{1-4}$ linear or branched alkyl and a $C_{2-4}$ linear or branched alkenyl.

According to this invention, in the formula (I), Requirement (1) is that one at most out of $R_4$, $R_5$ and $R_6$ represents hydrogen, and Requirement (2) is that at least one (preferably at least two) out of $R_4$, $R_5$ and $R_6$ is selected from the $C_{5-12}$ monocyclic cycloalkyl and the $C_{5-12}$ monocyclic cycloalkenyl. As the Requirement (2), it is more preferable that at least one (preferably at least two) out of $R_4$, $R_5$ and $R_6$ is the $C_{5-12}$ monocyclic cycloalkyl.

According to a preferred embodiment of this invention, in the compound represented by the formula (I), the ratio of the total number of the carbon atoms (not including the carbon atom of the substituent, if any) to the total number of the nitrogen atoms (i.e. the C/N ratio) is generally 10 or more, 12 or more or 13 or more.

According to this invention, as the compound represented by the formula (I), specifically there may be exemplified N,N-diethyl cyclohexylamine (having a C/N ratio of 10), dicyclohexyl amine (having a C/N ratio of 12) and N-methyl dicyclohexyl amine (having a C/N ratio of 13).

According to this invention, as the compound represented by the formula (I), one kind or a mixture of two or more kinds at any ratio therebetween could be used.

According to this invention, by "aza arene", it is to be understood in a conventional manner in the organic chemistry, and for example, may refer to a compound obtained by replacing a carbon atom on the ring of an arene by a nitrogen atom, specifically, monoaza benzene (pyridine) or monoaza naphthalene (quinoline or isoquinoline). As the aza arene, there may be exemplified a monoaza, diaza or triaza arene. As the arene, there may be exemplified a $C_{6-20}$ arene, wherein preference is given to a $C_{6-14}$ arene, especially benzene, naphthalene, anthracene and phenanthrene. On each carbon atom constituting the ring skeleton of the aza arene, there may further optionally exist a substituent selected from the group consisting of a $C_{1-4}$ linear or branched alkyl and a $C_{2-4}$ linear or branched alkenyl (hereinafter referred to as substituent A). Further, on each nitrogen atom constituting the ring skeleton of the aza arene, there may further optionally exist a (one) substituent selected from the group consisting of a $C_{1-12}$ linear or branched alkyl, a $C_{2-12}$ linear or branched alkenyl, a $C_{5-12}$ monocyclic cycloalkyl, a $C_{5-12}$ monocyclic cycloalkenyl and a $C_{6-20}$ aryl (referred to as substituent B). As the $C_{1-12}$ linear or branched alkyl, there may be exemplified a $C_{1-10}$ linear or branched alkyl, a $C_{1-6}$ linear or branched alkyl or a $C_{1-4}$ linear or branched alkyl, specifically there may be exemplified methyl, ethyl, propyl and butyl. As the $C_{2-12}$ linear or branched alkenyl, there may be exemplified a $C_{2-10}$ linear or branched alkenyl, a $C_{2-6}$ linear or branched alkenyl or a $C_{2-4}$ linear or branched alkenyl, specifically there may be exemplified vinyl, propenyl, allyl and butenyl. As the $C_{5-12}$ monocyclic cycloalkyl, there may be exemplified a $C_{6-10}$ monocyclic cycloalkyl or a $C_{6-5}$ monocyclic cycloalkyl, specifically there may be exemplified cyclopentyl, cyclohexyl, cycloheptyl, cyclooctyl, cyclononyl and cyclodecyl, wherein preference is given to cyclohexyl and cycloheptyl. The monocyclic cycloalkyl may further optionally carry one or more (for example, from 1 to 5, from 1 to 3 or 1) substituent selected from the group consisting of a $C_{1-4}$ linear or branched alkyl and a $C_{2-4}$ linear or branched alkenyl (hereinafter referred to as substituent A). As the $C_{5-12}$ monocyclic cycloalkenyl, there may be exemplified a $C_{6-10}$ monocyclic cycloalkenyl or a $C_{6-8}$ monocyclic cycloalkenyl, specifically there may be exemplified cyclopentenyl, cyclopentadienyl, cyclohexenyl, cyclohexadienyl, cycloheptenyl, cycloheptatrienyl, cyclooctenyl, cyclooctatetraenyl, cyclononenyl and cyclodecenyl. The monocyclic cycloalkenyl may further optionally carry one or more (for example, from 1 to 5, from 1 to 3 or 1) substituent selected from the group consisting of a $C_{1-4}$ linear or branched alkyl and a $C_{2-4}$ linear or branched alkenyl (hereinafter referred to as substituent A). As the $C_{6-20}$ aryl, there may be exemplified a $C_{6-14}$ aryl or a $C_{6-10}$ aryl, specifically there may be exemplified phenyl, naphthyl, anthracenyl and phenanthrenyl. The aryl may further optionally carry one or more (for example, from 1 to 5, from 1 to 3 or 1) substituent selected from the group consisting of a $C_{1-4}$ linear or branched alkyl and a $C_{2-4}$ linear or branched alkenyl (hereinafter referred to as substituent A).

According to a preferred embodiment of this invention, in the aza arene, the ratio of the total number of the carbon atoms (not including the carbon atom of the substituent A (if any) but including that of the substituent B (if any)) to the total number of the nitrogen atoms (i.e. the C/N ratio) is generally 9 or more, 10 or more or 11 or more.

According to this invention, as the aza arene, specifically there may be exemplified quinoline (having a C/N ratio of 9), N-phenyl quinoline (having a C/N ratio of 15), N-cyclohexyl pyridine (having a C/N ratio of 11) and 6-methyl quinoline (having a C/N ratio of 9).

According to this invention, as the aza arene, one kind or a mixture of two or more kinds at any ratio therebetween could be used.

According to this invention, in the process, it is acceptable, if needed, to further introduce a halogen source, whereby introducing halogen into the composition of the molecular sieve product. As the halogen source, there may be exemplified an inorganic halogen source, specifically HF, NaCl, $NH_4F$, KF. or an organic halogen source, specifically a halo $C_{1-3}$ alkane, e.g. dichloromethane, trichloromethane, dichloroethane, iodomethane. As the halogen source, one kind or a mixture of two or more kinds at any ratio therebetween could be used.

According to this invention, in the process, the ratio by molar between the first oxide source (calculated as the first oxide), the second oxide source (calculated as the second oxide), the alkali source, the organic template, the halogen source and water is generally 1:(0.0005-0.05):(0.01-0.3):(0.05-1.4):(0-0.5):(5-100), preferably 1:(0.005-0.04):(0.05-0.2):(0.2-1.0):(0-0.3):(10-40).

According to this invention, in the process, the crystallization conditions include: a crystallization temperature of 140-180 degrees Celsius, preferably 145-170 degrees Celsius, a crystallization duration of 1-6 days, preferably 2-5 days.

According to this invention, in the process, upon completion of the contacting step or the crystallization, any separation method conventionally known in this field may be used to isolate the molecular sieve (generally corresponding to the SCM-2 molecular sieve, sometimes also referred to as molecular sieve precursor) from the obtained reaction mixture as the final product. As the separation method, there may be exemplified a method wherein the obtained reaction mixture is filtered, washed and dried.

According to this invention, in the process, the filtering, washing and drying can be conducted in any manner conventionally known in this field. Specifically, as the filtration, there may be exemplified a method of simply suction filtering the obtained reaction mixture. As the washing, there may be exemplified a method of washing with deionized water till the filtrate reaches a pH value of 7-9, preferably 8-9. As the drying temperature, there may be exemplified a temperature of 40-250 degrees Celsius, preferably a temperature of 60-150 degrees Celsius, as the drying duration, there may be exemplified a duration of 8-30 h, preferably a duration of 10-20 h. The drying could be conducted under the normal pressure or a reduced pressure.

According to this invention, in the process, if needed, the obtained SCM-2 molecular sieve could be calcinated so as to remove the organic template and any water therefrom, whereby obtaining a calcinated molecular sieve, which generally corresponds to the aforesaid SCM-1 molecular sieve.

According to this invention, in the process, the calcination could be conducted in any manner conventionally known in this field, for example, the calcination temperature is generally 300-800 degrees Celsius, preferably 400-650 degrees Celsius, while the calcination duration is generally 1-10 h, preferably 3-6 h. Further, the calcination is generally conducted under an oxygen containing atmosphere, for example, under the air atmosphere or under oxygen atmosphere.

According to this invention, the SCM-1 molecular sieve, the SCM-2 molecular sieve or the molecular sieve produced in line with the process of this invention (all referred to as the molecular sieve according to this invention), if needed, may be ion-exchanged in a manner conventionally known in this field, for example, by ion-exchanging or solution immersion (see for example U.S. Pat. No. 3,140,249 and U.S. Pat. No. 3,140,253 for the details of these methods), whereby replacing all or a part of the metal cation (for example, Na ion or K ion, depending on how it is produced) in its composition by other cation. As the other cation, there may be exemplified hydrogen ion, other alkali metal ion (including K ion, Rb ion), ammonium ion (including $NH_4$ ion, quaternary ammonium ion for example tetramethylammonium ion and tetraethylammonium ion), alkaline earth metal ion (including Mg ion, Ca ion), Mn ion, Zn ion, Cd ion, a noble metal ion (including Pt ion, Pd ion, Rh ion), Ni ion, Co ion, Ti ion, Sn ion, Fe ion and/or a rare earth metal ion.

The molecular sieve according to this invention, if needed, may be treated by a diluted acid solution or the like so as to raise the Si/Al ratio, or by steam so as to raise the resistance of the molecular sieve crystal to acid erosion.

According to this invention, the present process follows the basic reaction principle of a conventional hydrothermal process for producing a molecular sieve, and for this reason, when compared with the process for producing the ITQ-2 molecular sieve, is characterized by a fewer number of operation steps, a simplified crystallization system, mild crystallization conditions and a simplified and controllable crystallization procedure, and thus less energy and material consumption (indicating a low production cost), a significantly higher yield of the molecular sieve product of generally more than 80%, sometimes 90% or more, or even approximating 100%. Further, the molecular sieve according to this invention is characterized by an extremely lowered content of impurities, for example, if observed with transmission electron microscope (TEM), at least 80%, preferably at least 85%, more preferably at least 90%, more preferably at least 95%, more preferably at least 99% of all crystals of the molecular sieve product (for example, the SCM-1 molecular sieve or the SCM-2 molecular sieve) immediately after production are flake crystals having a thickness of about 5 nm (for example, 5±0.8 nm), whereby presenting as nearly pure crystalline molecular sieve. Accordingly, in these molecular sieves, non-crystals (as impurities) are contained at a much lower content, for example, with a non-crystal content of generally 20% or less, preferably 15% or less, more preferably 10% or less, more preferably 5% or less, further preferably 1% or less.

Without being bounded by any theory, it is believed that the molecular sieve according to this invention has a "dual" elementary building layer structure, since it has a thickness two times that of the elementary building layer structure (about 2.5 nm) constituting a MCM-22 molecular sieve. The dual elementary building layer structure of the present molecular sieve is so distinctive that the goal of "exposing as much as possible the twelve-membered ring semi-supercages of the MWW topological structure, while retaining the ten-membered ring pores", which has been never achieved before in the prior art, was eventually achieved by this invention, and has to be identified as a novel structure that has never been obtained in the prior art.

According to this invention, a specific combination of different organic templates is used such that different (rather than one single kind of) organic species enter in-between the elementary building layer structures of the molecular sieve at the same time, which is responsible for the difference in microstructure between the SCM-1 molecular sieve or the SCM-2 molecular sieve according to this invention and a prior art MCM-22 molecular sieve. Further, when x ray diffraction (XRD) is used to characterize these molecular sieves respectively, as aforesaid discussed, the difference in microstructure therebetween is embodied by the difference in multiple diffraction peaks in the XRD pattern. Though not bounded by any theory, it is believed that the difference in these diffraction peaks (especially those diffraction peaks characterizing the lamella stacking or the stacking thickness in the c-axis direction) expressively indicates that the molecular sieve according to this invention is different from a MCM-22 molecular sieve or an ITQ-2 molecular sieve in terms of layer structure. Further, the difference in microstructure is further embodied by the difference in property parameters like the specific surface area. For example, the external specific surface area of the molecular sieve according to this invention accounts for generally not less than 40% of the total specific surface area, which is significantly higher than that of the prior art MCM-22 molecular sieve (generally about 20%).

The molecular sieve according to this invention, has relatively higher total specific surface area and external specific surface area, and therefore is especially suitable for use as an adsorbent, for example, that to be used in a gaseous or liquid phase to isolate at least one component from a mixture made of multiple components.

The molecular sieve according to this invention, exposes as much as possible the twelve-membered ring semi-super-cages of the MWW topological structure, and at the same time, retains the ten-membered ring pores, and therefore is especially suitable for use in an organic compound converting reaction as a catalyst, which can exhibit both a high reactant converting capability and a high product selectivity. As the organic compound converting reaction, there may be exemplified an alkylation reaction in liquid phase of benzene and ethylene to produce ethylbenzene, an alkylation reaction in liquid phase of benzene and propylene to produce isopropylbenzene, a butene isomerization reaction, a naphtha cracking reaction, an alkylation reaction of ethanol and benzene, a cyclohexene hydration reaction. As the catalyst, there may be exemplified an alkylation catalyst, an olefin hydration catalyst, an olefin oxidation catalyst, a hydrocracking catalyst or an olefin isomerization catalyst.

The molecular sieve according to this invention, even for a severely diffusion-restricted reaction (for example, the Beckmann rearrangement reaction of cyclohexanone oxime), can still exhibit at least comparable or even greater reactant converting capability as compared with an ITQ-2 molecular sieve, whereby retaining the original advantages of the ITQ-2 molecular sieve to the most extent.

The molecular sieve according to this invention, when used in catalyzing the alkylation reaction of benzene, only a relatively lowered reaction temperature is needed with a high reactant conversion and a high product selectivity, with a stable operation.

The molecular sieve according to this invention, has a stable framework structure, and is robust in the resistance to carbon deposition, i.e. less tendency to carbon deposition in a catalytic reaction, and therefore can function as a catalyst with an elongated service life without significant activity loss.

The molecular sieve according to this invention, can be simply regenerated by calcination at elevated temperatures after losing activity, and its catalytic performances can be recovered to substantially the same level of a fresh catalyst by this regeneration. Herein, the calcination conditions include: the calcination temperature is generally 300-800 degrees Celsius, preferably 400-650 degrees Celsius, while the calcination duration is generally 1-10 h, preferably 3-6 h. Further, the calcination is generally conducted under an oxygen containing atmosphere, for example, under the air atmosphere or under oxygen atmosphere.

The molecular sieve according to this invention may present in any physical form, for example, powder, particulate or a molded product (for example, strip, clover). These physical forms can be obtained in any manner conventionally known in this field, without any specific limitation thereto.

The molecular sieve according to this invention may be combined with other material, whereby obtaining a molecular sieve composition. As these other materials, there may be exemplified an active material and an non-active material.

As the active material, there may be exemplified synthesized zeolites and natural zeolites, as the non-active material (generally referred to as binder), there may be exemplified clay, white earth, silica gel and alumina. As these other materials, one kind or a mixture of two or more kinds at any ratio therebetween could be used. As the amount of these other materials, any amount conventional used in this field could be used, without any specific limitation thereto.

According to this invention, the present molecular sieve or molecular sieve composition may be further used as a catalyst carrier or the carrier component for a catalyst, and be supported thereon an active component in a manner conventionally known in this field (for example, solution immersion). The active component includes but not limiting to an active metal component (including Ni, Co, Mo, W or Cu), an active inorganic adjuvant (for example, F, P) and an organic compound (for example, organic acids or organic amines). As the active component, one kind or a mixture of two or more kinds at any ratio therebetween could be used. As the amount of the active component, any conventional amount can be used without any specific limitation.

According to this invention, prior to use as an adsorbent or a catalyst, the SCM-2 molecular sieve or a molecular sieve composition comprising the SCM-2 molecular sieve is generally calcinated to remove any organic template and water in the pores. Herein, the calcination may be conducted in any manner conventionally known in this field, for example, the calcination temperature is generally 300-800 degrees Celsius, preferably 400-650 degrees Celsius, while the calcination duration is generally 1-10 h, preferably 3-6 h. Further, the calcination is generally conducted under an oxygen containing atmosphere, for example, under the air atmosphere or under oxygen atmosphere.

EXAMPLE

The following Examples are intended to illustrate in more details rather than to limit this invention.

In the context of this specification, including the following Examples and Comparative Examples, the total pore volume, the micropore volume, the total specific surface area and the external specific surface area of a molecular sieve was determined by a nitrogen adsorption desorption method (i.e. BET method). Specifically, a physical adsorption instrument (e.g. the TriStar 3000a physical adsorption instrument from Micromeritics Instrument Corp USA) was used to obtain the nitrogen physical adsorption and desorption isotherms of the molecular sieve, and then the BET equation and the t-plot equation were applied to conduct a calculation. The test conditions for a SCM-1 molecular sieve are: a test temperature of −169 degrees Celsius, and prior to the test, a pre-treatment under vacuum of the molecular sieve at 300 degrees Celsius for 10 h, while the test conditions for a SCM-2 molecular sieve are: a test temperature of −169 degrees Celsius, and prior to the test, a heating treatment of the molecular sieve under the air atmosphere at 550 degrees Celsius for 5 h and then a pre-treatment under vacuum at 300 degrees Celsius for 10 h.

In the context of this specification, including the following Examples and Comparative Examples, the X-ray diffraction (XRD) pattern of a molecular sieve was determined with the standard method on a X-ray powder diffractometer (for example, the D8 Advance powder diffractometer from Bruker Corporation Germany), with a Cu-K α ray source and a nickel filter.

In the context of this specification, including the following Examples and Comparative Examples, the transmission electron microscope (TEM) photo of a molecular sieve was obtained with a transmission electron microscope (for example, the G2F30 transmission electron microscope from the FEI Corporation Holland, at an operating voltage of 300 kV) at a magnification of 100000 times.

In the context of this specification, including the following Examples and Comparative Examples, the ratio by molar of the first oxide to the second oxide in a molecular sieve was determined by the inductively coupled plasma atomic emission spectrometry (for example, the 725-ES inductively coupled plasma atomic emission spectrometer from Varian Corporation USA).

In the context of this specification, including the following Examples and Comparative Examples, the content of water or that of the organic template in a molecular sieve was determined by a thermo-gravimetric analysis (for example, with the SDT Q600 simultaneous thermal analyzer from TA Corporation USA, under an oxygen atmosphere, starting from 25 degrees Celsius at a heating rate of 10 degrees Celsius/min, heated to 800 degrees Celsius, to obtain the thermogravimetric curve of the sample).

In the context of this specification, including the following Examples and Comparative Examples, the yield of a molecular sieve was calculated by [the total weight of the molecular sieve after calcination/the total fed amount of the first oxide and the second oxide]×100%.

In the context of this specification, including the following Examples and Comparative Examples, the crystal thickness of a molecular sieve was determined as: with a transmission electron microscope (for example, with the G2F30 transmission electron microscope from the FEI Corporation Holland, at an operating voltage of 300 kV) at a magnification of 100000 times, the molecular sieve was observed with a randomly selected observational field, each of the flake crystals having a thickness of 5±0.8 nm in this observational field was identified and measured for its thickness, then an average number of these thicknesses was calculated. The operation was repeated for 10 times in total. The average of these 10 average numbers was taken as the crystal thickness.

In the context of this specification, including the following Examples and Comparative Examples, the relative crystallinity of a molecular sieve was determined as follows: taking the MCM-22 molecular sieve as a reference, three diffraction peaks characteristic of the MWW topological structure around 2θ=7.2°, 25.0° and 26.0° in its X ray diffraction pattern was identified, the total absolute peak intensity of these three diffraction peaks was referred to as A as the reference, the total absolute peak intensity of the corresponding three diffraction peaks of the tested molecular sieve was referred to as B, then the relative crystallinity of the tested molecular sieve was calculated as (B/A)×100%. By subtracting the relative crystallinity from 100%, the non-crystal content of this tested molecular sieve was obtained. In the following Examples and Comparative Examples, the MCM-22 molecular sieve produced in Comparative Example I-1 was used as the reference.

In the context of this specification, including the following Examples and Comparative Examples, the service life of a molecular sieve was determined as: under the same reaction conditions, the same amount of molecular sieve was used as the catalyst to continuously conduct the reaction, within the same reaction duration, the more significant the reduction in the reactant conversion, the shorter the service life of this molecular sieve is.

The following examples illustrate the production of a SCM-1 molecular sieve.

Example I-1

12.64 g sodium aluminate ($Al_2O_3$ 43.0 wt %, $Na_2O$ 35.0 wt %) was firstly dissolved into 362.40 g water, then under stirring, there were added the organic templates: 39.68 g of an aqueous hexamethyleneimine solution (with a hexamethyleneimine content of 80.0 wt %), 101.54 g dicyclohexylamine, finally there was added 240 g silica sol (with a silica content of 40.0 wt %), wherein the ratios by molar between the starting materials were:

silica/alumina=30
NaOH/silica=0.09
hexamethylene imine/silica=0.2
dicyclohexyl amine/silica=0.35
water/silica=18.

The resultant was mixed till homogeneous, loaded into a stainless reactor, and then under stirring at 150 degrees Celsius crystallized for 4 days, upon completion of the crystallization, filtered, washed and dried, to obtain a molecular sieve precursor. The precursor was then at 550 degrees Celsius under the air atmosphere calcinated for 5 h to obtain a molecular sieve.

The XRD spectrum data of the molecular sieve product were as illustrated in Table I-1, while the XRD pattern thereof was as illustrated in FIG. 1, the TEM image thereof was as illustrated in FIG. 3a. A measurement on the molecular sieve product revealed that, the total pore volume was 0.68 cm$^3$·g$^{-1}$, the micropore volume was 0.12 cm$^3$·g$^{-1}$, the total specific surface area was 524 m$^2$·g$^{-1}$, the external specific surface area was 248 m$^2$·g$^{-1}$, the external specific surface area accounted for 47.3% of the total specific surface area, the composition was that: a silica/alumina ratio by molar of 29.3, a molecular sieve yield of 92%, a crystal thickness of 5.4 nm, a relative crystallinity of 92.2%, a non-crystal content of 7.8%.

TABLE I-1

| 2θ/° | d/Å | I | I/I$_0$ × 100 |
|---|---|---|---|
| 4.20 | 21.04 | 569.9 | 46 |
| 7.17 | 12.32 | 1239.0 | 100 |
| 7.98 | 11.07 | 669.1 | 54 |
| 9.71 | 9.10 | 433.7 | 35 |
| 12.86 | 6.88 | 161.1 | 13 |
| 14.37 | 6.16 | 433.7 | 35 |
| 15.90 | 5.57 | 173.5 | 14 |
| 20.26 | 4.38 | 173.5 | 14 |
| 21.93 | 4.05 | 309.8 | 25 |
| 22.67 | 3.92 | 346.9 | 28 |
| 23.64 | 3.76 | 223.0 | 18 |
| 25.06 | 3.55 | 223.0 | 18 |
| 26.03 | 3.42 | 557.6 | 45 |
| 26.91 | 3.31 | 185.9 | 15 |

Example I-2

12.64 g sodium aluminate ($Al_2O_3$ 43.0 wt %, $Na_2O$ 35.0 wt %) was firstly dissolved into 362.40 g water, then under stirring, there were added the organic templates: 39.68 g of an aqueous hexamethylene imine solution (with a hexamethylene imine content of 80.0 wt %), 145.06 g dicyclohexyl amine, finally there was added 240 g silica sol (with a silica content of 40.0 wt %), wherein the ratios by molar between the starting materials were:

silica/alumina=30

NaOH/silica=0.09 hexamethylene imine/silica=0.2 dicyclohexyl amine/silica=0.50 water/silica=18.

The resultant was mixed till homogeneous, loaded into a stainless reactor, and then under stirring at 150 degrees Celsius crystallized for 108 h, upon completion of the crystallization, filtered, washed and dried, to obtain a molecular sieve precursor, the precursor was then at 550 degrees Celsius under the air atmosphere calcinated for 5 h to obtain a molecular sieve.

The XRD spectrum data of the molecular sieve product were as illustrated in Table I-2, while the XRD pattern thereof is similar to FIG. 1. A measurement on the molecular sieve product revealed that, the total pore volume was 0.76 cm$^3$ g$^{-1}$, the micropore volume was 0.12 cm$^3$ g$^{-1}$, the total specific surface area was 533 m$^2$·g$^{-1}$, the external specific surface area was 257 m$^2$·g$^{-1}$, the external specific surface area accounted for 48.2% of the total specific surface area, the composition was that: a silica/alumina ratio by molar of 28.6, a molecular sieve yield of 82%, a crystal thickness of 5.1 nm, a relative crystallinity of 81.9%, a non-crystal content of 18.1%.

TABLE I-2

| 2θ/° | d/Å | I | I/I$_0$ × 100 |
|---|---|---|---|
| 4.01 | 22.00 | 417.4 | 37 |
| 7.17 | 12.32 | 1128.0 | 100 |
| 7.98 | 11.07 | 541.4 | 48 |
| 9.83 | 8.99 | 338.4 | 30 |
| 12.85 | 6.88 | 101.5 | 9 |
| 14.37 | 6.16 | 338.4 | 30 |
| 15.89 | 5.57 | 67.7 | 6 |
| 20.25 | 4.38 | 79.0 | 7 |
| 21.94 | 4.05 | 248.2 | 22 |
| 22.63 | 3.92 | 282.0 | 25 |
| 23.76 | 3.74 | 169.2 | 15 |
| 25.04 | 3.55 | 203.0 | 18 |
| 26.03 | 3.42 | 462.5 | 41 |
| 26.92 | 3.31 | 157.9 | 14 |

Example I-3

The same as Example I-1, except that silica/alumina=100, NaOH/silica=0.20, homopiperazine/silica=0.35, dicyclohexylamine/silica=0.20, water/silica=20, at 150 degrees Celsius crystallized for 72 h.

The XRD spectrum data of the molecular sieve product were as illustrated in Table I-3, while the XRD pattern thereof is similar to FIG. 1. A measurement on the molecular sieve product revealed that, the total pore volume was 0.88 cm$^3$ g$^{-1}$, the micropore volume was 0.13 cm$^3$ g$^{-1}$, the total specific surface area was 583 m$^2$·g$^{-1}$, the external specific surface area was 313 m$^2$·g$^{-1}$, the external specific surface area accounted for 53.7% of the total specific surface area, the composition was that: a silica/alumina ratio by molar of 90.5, a molecular sieve yield of 81%, a crystal thickness of 5.6 nm, a relative crystallinity of 84.4%, a non-crystal content of 15.6%.

TABLE I-3

| 2θ/° | d/Å | I | I/I$_0$ × 100 |
|---|---|---|---|
| 4.23 | 20.88 | 494.3 | 42 |
| 7.17 | 12.32 | 1177.0 | 100 |
| 7.99 | 11.05 | 588.5 | 50 |
| 9.82 | 9.00 | 388.4 | 33 |
| 12.86 | 6.88 | 164.8 | 14 |
| 14.37 | 6.16 | 423.7 | 36 |
| 15.90 | 5.67 | 141.2 | 12 |
| 20.25 | 4.38 | 117.7 | 10 |
| 21.94 | 4.05 | 200.1 | 17 |
| 22.64 | 3.92 | 317.8 | 27 |
| 23.78 | 3.74 | 117.7 | 10 |
| 25.04 | 3.55 | 129.5 | 11 |
| 26.06 | 3.42 | 541.4 | 46 |
| 26.93 | 3.31 | 153.0 | 13 |

Example I-4

The same as Example I-1, except that silica/alumina=50, NaOH/silica=0.07, homopiperazine/silica=0.33, N,N-diethyl cyclohexylamine/silica=0.50, at 150 degrees Celsius crystallized for 3 days.

The XRD spectrum data of the molecular sieve product were as illustrated in Table I-4, while the XRD pattern thereof is similar to FIG. 1. A measurement on the molecular sieve product revealed that, the total pore volume was 0.80 cm$^3$ g$^{-1}$, the micropore volume was 0.11 cm$^3$ g$^{-1}$, the total specific surface area was 511 m$^2$·g$^{-1}$, the external specific surface area was 224 m$^2$·g$^{-1}$, the external specific surface area accounted for 43.8% of the total specific surface area, the composition was that: a silica/alumina ratio by molar of 46.1, a molecular sieve yield of 85%, a crystal thickness of 5.1 nm, a relative crystallinity of 77.9%, a non-crystal content of 22.1%.

TABLE I-4

| 2θ/° | d/Å | I | I/I$_0$ × 100 |
|---|---|---|---|
| 4.25 | 20.76 | 401.4 | 36 |
| 7.18 | 12.30 | 1115.0 | 100 |
| 8.00 | 11.04 | 490.6 | 44 |
| 9.80 | 9.02 | 446.0 | 40 |
| 12.84 | 6.89 | 133.8 | 12 |
| 14.38 | 6.15 | 334.5 | 30 |
| 15.92 | 5.56 | 145.0 | 13 |
| 20.26 | 4.38 | 156.1 | 14 |
| 21.94 | 4.05 | 189.6 | 17 |
| 22.80 | 3.90 | 289.9 | 26 |
| 23.84 | 3.73 | 156.1 | 14 |
| 25.05 | 3.55 | 167.3 | 15 |
| 26.06 | 3.42 | 423.7 | 38 |
| 26.94 | 3.31 | 167.3 | 15 |

Example I-5

The same as Example I-1, except that silica/alumina=26, KOH/silica=0.25, hexamethyleneimine/silica=1.0, N-methyl dicyclohexyl amine/silica=0.60, water/silica=16, at 150 degrees Celsius crystallized for 30 h.

The XRD spectrum data of the molecular sieve product were as illustrated in Table I-5, while the XRD pattern thereof is similar to FIG. 1. A measurement on the molecular sieve product revealed that, the total pore volume was 0.66 cm$^3$ g$^{-1}$, the micropore volume was 0.12 cm$^3$ g$^{-1}$, the total specific surface area was 501 m$^2$·g$^{-1}$, the external specific surface area was 232 m$^2$·g$^{-1}$, the external specific surface area accounted for 46.3% of the total specific surface area, the composition was that: a silica/alumina ratio by molar of 26.3, a molecular sieve yield of 85%, a crystal thickness of 5.7 nm, a relative crystallinity of 85.7%, a non-crystal content of 14.3%.

TABLE I-5

| 2θ/° | d/Å | I | I/I₀ × 100 |
|---|---|---|---|
| 4.31 | 20.50 | 478.4 | 40 |
| 7.15 | 12.35 | 1196.0 | 100 |
| 8.02 | 11.02 | 502.3 | 42 |
| 9.83 | 8.99 | 466.4 | 39 |
| 12.96 | 6.82 | 95.7 | 8 |
| 14.37 | 6.16 | 430.6 | 36 |
| 15.95 | 5.55 | 119.6 | 10 |
| 20.21 | 4.39 | 107.6 | 9 |
| 21.87 | 4.06 | 251.2 | 21 |
| 22.65 | 3.92 | 346.8 | 29 |
| 23.71 | 3.75 | 107.6 | 9 |
| 25.04 | 3.55 | 119.6 | 10 |
| 26.03 | 3.42 | 562.1 | 47 |
| 26.95 | 3.30 | 155.5 | 13 |

Example I-6

The same as Example I-1, except that silica/alumina=40, KOH/silica=0.2, piperidine/silica=0.8, quinoline/silica=0.65, water/silica=17, at 150 degrees Celsius crystallized for 60 h.

The XRD spectrum data of the molecular sieve product were as illustrated in Table I-6, while the XRD pattern thereof is similar to FIG. 1. A measurement on the molecular sieve product revealed that, the total pore volume was 0.62 cm$^3$ g$^{-1}$, the micropore volume was 0.13 cm$^3$ g$^{-1}$, the total specific surface area was 496 m$^2$·g$^{-1}$, the external specific surface area was 227 m$^2$·g$^{-1}$, the external specific surface area accounted for 45.8% of the total specific surface area, the composition was that: a silica/alumina ratio by molar of 39.7, a molecular sieve yield of 89%, a crystal thickness of 5.5 nm, a relative crystallinity of 92.7%, a non-crystal content of 7.3%.

TABLE I-6

| 2θ/° | d/Å | I | I/I₀ × 100 |
|---|---|---|---|
| 4.06 | 21.72 | 475.2 | 40 |
| 7.15 | 12.35 | 1188.0 | 100 |
| 7.96 | 11.10 | 558.4 | 47 |
| 9.79 | 9.03 | 380.2 | 32 |
| 12.89 | 6.86 | 118.8 | 10 |
| 14.33 | 6.17 | 463.3 | 39 |
| 15.83 | 5.59 | 106.9 | 9 |
| 20.27 | 4.38 | 130.7 | 11 |
| 21.95 | 4.04 | 225.7 | 19 |
| 22.73 | 3.91 | 320.8 | 27 |
| 23.71 | 3.75 | 142.6 | 12 |
| 25.08 | 3.54 | 190.1 | 16 |
| 25.99 | 3.42 | 653.4 | 55 |
| 26.92 | 3.31 | 178.2 | 15 |

Example I-7

The same as Example I-1, except that silica/alumina=40, KOH/silica=0.2, hexamethylene imine/silica=0.2, piperidine/silica=0.2, dicyclohexylamine/silica=0.4, water/silica=19, at 150 degrees Celsius crystallized for 4 days.

The XRD spectrum data of the molecular sieve product were as illustrated in Table I-7, while the XRD pattern thereof is similar to FIG. 1. A measurement on the molecular sieve product revealed that, the total pore volume was 0.71 cm$^3$ g$^{-1}$, the micropore volume was 0.14 cm$^3$ g$^{-1}$, the total specific surface area was 561 m$^2$·g$^{-1}$, the external specific surface area was 271 m$^2$·g$^{-1}$, the external specific surface area accounted for 48.3% of the total specific surface area, the composition was that: a silica/alumina ratio by molar of 39.0, a molecular sieve yield of 88%, a crystal thickness of 5.5 nm, a relative crystallinity of 89.8%, a non-crystal content of 10.2%.

TABLE I-7

| 2θ/° | d/Å | I | I/I₀ × 100 |
|---|---|---|---|
| 4.17 | 21.18 | 452.1 | 37 |
| 7.17 | 12.32 | 1222.0 | 100 |
| 8.02 | 11.02 | 476.6 | 39 |
| 9.81 | 9.01 | 366.6 | 30 |
| 12.83 | 6.89 | 97.8 | 8 |
| 14.37 | 6.16 | 391.0 | 32 |
| 16.00 | 5.53 | 97.8 | 8 |
| 20.23 | 4.39 | 207.7 | 17 |
| 21.96 | 4.04 | 268.8 | 22 |
| 22.73 | 3.91 | 329.9 | 27 |
| 23.84 | 3.73 | 207.7 | 17 |
| 25.04 | 3.55 | 207.7 | 17 |
| 26.07 | 3.42 | 537.7 | 44 |
| 26.91 | 3.31 | 207.7 | 17 |

Example I-8

The same as Example I-1, except that silica/alumina=40, KOH/silica=0.12, hexamethyleneimine/silica=0.23, N,N-diethyl cyclohexylamine/silica=0.35, dicyclohexyl amine/silica=0.05, water/silica=19, at 150 degrees Celsius crystallized for 80 h.

The XRD spectrum data of the molecular sieve product were as illustrated in Table I-8, while the XRD pattern thereof is similar to FIG. 1. A measurement on the molecular sieve product revealed that, the total pore volume was 0.75 cm$^3$ g$^{-1}$, the micropore volume was 0.12 cm$^3$ g$^{-1}$, the total specific surface area was 518 m$^2$·g$^{-1}$, the external specific surface area was 240 m$^2$·g$^{-1}$, the external specific surface area accounted for 46.3% of the total specific surface area, the composition was that: a ratio by molar between silica/alumina of 40.4, a molecular sieve yield of 81%, a crystal thickness of 5.3 nm, a relative crystallinity of 82.9%, a non-crystal content of 17.1%.

TABLE I-8

| 2θ/° | d/Å | I | I/I₀ × 100 |
|---|---|---|---|
| 3.99 | 22.12 | 454.0 | 39 |
| 7.19 | 12.29 | 1164.0 | 100 |
| 8.02 | 11.02 | 523.8 | 45 |
| 9.82 | 9.00 | 488.9 | 42 |
| 12.76 | 6.87 | 116.4 | 10 |
| 14.39 | 6.15 | 395.8 | 34 |
| 16.00 | 5.53 | 116.4 | 10 |
| 20.26 | 4.38 | 93.1 | 8 |
| 21.98 | 4.04 | 197.9 | 17 |
| 22.73 | 3.91 | 267.7 | 23 |
| 23.74 | 3.74 | 93.1 | 8 |
| 25.02 | 3.56 | 128.0 | 11 |
| 26.05 | 3.42 | 523.8 | 45 |
| 26.92 | 3.31 | 186.2 | 16 |

Example I-9

50 g of the molecular sieve produced in Example I-1 was weighted, and exchanged with an ammonium nitrate solution having a concentration of 1 mol/L for 4 times, filtered, and dried, then thoroughly mixed with 20 g alumina, then there was added a 5 wt % nitric acid, kneaded, extruded into a bar of φ1.6×2 mm, then dried at 120 degrees Celsius, calcinated at 520 degrees Celsius under the air atmosphere for 6 h, produced into the desired catalyst.

0.3 g of the catalyst produced as aforesaid was weighted and loaded into a fixed-bed reactor, then there was introduced a mixture of benzene and ethylene. The reaction conditions are: an ethylene weight hourly space velocity of 3.0 h$^{-1}$, a ratio by molar of benzene to ethylene of 3.0, a reaction temperature of 205 degrees Celsius, a reaction pressure of 3.5 MPa. The operation continued for 24 h, then the reaction results are: an ethylene conversion of 98%, a selectivity by weight to ethyl benzene of 90.6%, a selectivity by weight to diethyl benzene of 9.0%, a selectivity by weight to triethyl benzene of 0.2%, with the remaining being by-products. The operation continued for 120 h, then the reaction results are: an ethylene conversion of 90%, a selectivity by weight to ethyl benzene of 88.1%, a selectivity by weight to diethyl benzene of 9.3%, a selectivity by weight to triethyl benzene of 0.3%, with the remaining being by-products. The operation continued for 10 days, the ethylene conversion decreased to 80% or less, and then the catalyst was discharged, appearing as black, calcinated at 550 degrees Celsius under the air atmosphere for 5 h to conduct regeneration. The regenerated catalyst, under the aforesaid reaction conditions, was reused for the alkylation reaction in liquid phase of benzene and ethylene. The operation continued for 24 h, then the reaction results are: an ethylene conversion of 97%, a selectivity by weight to ethyl benzene of 90.3%, a selectivity by weight to diethyl benzene of 9.1%, a selectivity by weight to triethyl benzene of 0.3%, with the remaining being by-products, indicating that the activity of the catalyst was recovered to the same level of a fresh catalyst.

Example I-10

50 g of the molecular sieve produced in Example I-2 was weighted, and exchanged with an ammonium nitrate solution having a concentration of 1 mol/L for 4 times, filtered, and dried, then thoroughly mixed with 20 g alumina, then there was added a 5 wt % nitric acid, kneaded, extruded into a bar of φ1.6×2 mm, then dried at 120 degrees Celsius, calcinated at 520 degrees Celsius under the air atmosphere for 6 h, produced into the desired catalyst.

0.3 g of the catalyst produced as aforesaid was weighted and loaded into a fixed-bed reactor, then there was introduced a mixture of benzene and ethylene. The reaction conditions are: an ethylene weight hourly space velocity of 5.0 h$^{-1}$, a ratio by molar of benzene to ethylene of 3.0, a reaction temperature of 195 degrees Celsius, a reaction pressure of 3.5 MPa. The operation continued for 24 h, then the reaction results are: an ethylene conversion of 98%, a selectivity by weight to ethyl benzene of 93.6%, a selectivity by weight to diethyl benzene of 5.9%, a selectivity by weight to triethyl benzene of 0.1%, with the remaining being by-products.

Example I-11

50 g of the molecular sieve produced in Example I-1 was weighted, and exchanged with an ammonium nitrate solution having a concentration of 1 mol/L for 4 times, filtered, and dried, then thoroughly mixed with 20 g alumina, then there was added a 5 wt % nitric acid, kneaded, extruded into a bar of φ1.6×2 mm, then dried at 120 degrees Celsius, calcinated at 520 degrees Celsius under the air atmosphere for 6 h, produced into the desired catalyst.

0.3 g of the catalyst produced as aforesaid was weighted and loaded into a fixed-bed reactor, then there was introduced a mixture of benzene and propylene. The reaction conditions are: a propylene weight hourly space velocity of 5.0 h$^{-1}$, a ratio by molar of benzene to propylene of 3.0, a reaction temperature of 170 degrees Celsius, a reaction pressure of 3.0 MPa. The operation continued for 30 h, then the reaction results are: a propylene conversion of 97%, a selectivity by weight to isopropylbenzene of 85%, a selectivity by weight to diisopropylbenzene of 14.3%, a selectivity by weight to triisopropylbenzene of 0.4%, with the remaining being by-products. The operation continued for 120 h, then the reaction results are: a propylene conversion of 91%, a selectivity by weight to isopropylbenzene of 83.2%, a selectivity by weight to diisopropylbenzene of 15.1%, a selectivity by weight to triisopropylbenzene of 0.3%, with the remaining being by-products.

Example I-12

50 g of the molecular sieve produced in Example I-1 was weighted, and exchanged with an ammonium nitrate solution having a concentration of 1 mol/L for 4 times, filtered, and dried. Then, the dried sample was tableted (at a pressure of 15 MPa), screened, the product of 20-40 mesh was collected as the sample, calcinated at 520 degrees Celsius under the air atmosphere for 6 h, produced into the desired catalyst.

0.1 g cyclohexanone oxime, 10 g benzonitrile (as the solvent) and 0.1 g of the catalyst produced as aforesaid were sequentially added to a 50 mL flask equipped with a reflux condenser, reacted at 130 degrees Celsius for 2 h, to conduct the Beckmann rearrangement reaction of cyclohexanone oxime. The reaction results are: a cyclohexanone oxime conversion of 67.3%, a selectivity to caprolactam of 79.5%.

Example I-13

50 g of the molecular sieve produced in Example I-1 was weighted, and exchanged with an ammonium nitrate solution having a concentration of 1 mol/L for 4 times, filtered, and dried, then the dried sample was tableted (at a pressure of 15 MPa), screened, the product of 20-40 mesh was collected as the sample, calcinated at 520 degrees Celsius under the air atmosphere for 6 h, produced into the desired catalyst.

0.1 g of the catalyst produced as aforesaid was weighted and loaded into a fixed-bed reactor, then there was introduced a mixture of biphenyl and propylene. The reaction conditions are: a biphenyl flow rate of 1.36 mol/h, a ratio by molar of biphenyl to propylene of 4.0, a reaction temperature of 250 degrees Celsius. The operation continued for 10 minutes, the biphenyl conversion was 3.7%. The operation continued for 2 h, the biphenyl conversion decreased nearly to 0. The catalyst was discharged and calcinated at 550 degrees Celsius under the air atmosphere for 5 h to conduct regeneration, the regenerated catalyst, under the aforesaid reaction conditions, was reused for the alkylation reaction of biphenyl and propylene, The operation continued for 10 minutes, the biphenyl conversion was 3.6%, indicating that the activity of the catalyst was recovered to the same level of a fresh catalyst.

Comparative Example I-1

A MCM-22 molecular sieve was produced in the same manner as Example 1 of U.S. Pat. No. 4,954,325. The XRD spectrum data of the produced MCM-22 molecular sieve were as illustrated in Table I-9, while the XRD pattern thereof was as illustrated in FIG. 1, the TEM image thereof was as illustrated in FIG. 3b. A measurement on the MCM-22 molecular sieve revealed that, the total pore volume was 0.46 cm$^3$·g$^{-1}$, the micropore volume was 0.18 cm$^3$ g$^{-1}$, the total specific surface area was 485 m$^2$·g$^{-1}$, the external specific surface area was 120 m$^2$·g$^{-1}$, the external specific surface area accounted for 24.7% of the total specific surface area, the composition was that: a silica/alumina ratio by molar of 29.1, a relative crystallinity of 100.0%, a non-crystal content of 0.0%.

TABLE I-9

| 2θ/° | d/Å | I | I/I$_0$ × 100 |
|---|---|---|---|
| 7.19 | 12.29 | 1281.0 | 100 |
| 8.02 | 11.02 | 640.5 | 50 |
| 9.99 | 8.85 | 666.1 | 52 |
| 12.89 | 6.86 | 166.5 | 13 |
| 14.39 | 6.15 | 666.1 | 52 |
| 14.77 | 5.99 | 153.7 | 12 |
| 15.99 | 5.54 | 205.0 | 16 |
| 18.04 | 4.91 | 38.4 | 3 |
| 19.04 | 4.66 | 51.2 | 4 |
| 19.34 | 4.58 | 64.1 | 5 |
| 20.29 | 4.37 | 153.7 | 12 |
| 21.65 | 4.10 | 166.5 | 13 |
| 21.92 | 4.05 | 166.5 | 13 |
| 22.74 | 3.91 | 371.5 | 29 |
| 23.76 | 3.74 | 230.6 | 18 |
| 25.02 | 3.56 | 140.9 | 11 |
| 26.05 | 3.42 | 768.6 | 60 |
| 26.96 | 3.30 | 166.5 | 13 |
| 27.82 | 3.20 | 140.9 | 11 |
| 28.65 | 3.11 | 102.5 | 8 |
| 29.74 | 3.00 | 51.2 | 4 |
| 31.62 | 2.83 | 38.4 | 3 |
| 32.38 | 2.76 | 38.4 | 3 |
| 33.39 | 2.68 | 64.1 | 5 |
| 34.45 | 2.60 | 38.4 | 3 |

Comparative Example I-2

The same as Example I-1, except that the template was a single kind of template: piperidine.
silica/alumina=30
NaOH/silica=0.15
piperidine/silica=0.2
water/silica=18.

The XRD spectrum data of the produced molecular sieve were as illustrated in Table I-10. The XRD pattern thereof is totally different from FIG. 1. A measurement on the molecular sieve product revealed that, the total pore volume was 0.13 cm$^3$ g$^{-1}$, the micropore volume was 0.10 cm$^3$ g$^{-1}$, the total specific surface area was 285 m$^2$·g$^{-1}$, the external specific surface area was 31 m$^2$·g$^{-1}$, the external specific surface area accounted for 10.9% of the total specific surface area, the composition was that: a silica/alumina ratio by molar of 28.1.

TABLE I-10

| 2θ/° | d/Å | I | I/I$_0$ × 100 |
|---|---|---|---|
| 7.78 | 11.35 | 182.8 | 7 |
| 9.30 | 9.50 | 2611.0 | 100 |
| 12.51 | 7.07 | 443.9 | 17 |
| 12.75 | 6.94 | 391.7 | 15 |
| 13.42 | 6.59 | 443.9 | 17 |
| 15.34 | 5.77 | 235.0 | 9 |

TABLE I-10-continued

| 2θ/° | d/Å | I | I/I$_0$ × 100 |
|---|---|---|---|
| 15.63 | 5.66 | 78.3 | 3 |
| 17.88 | 4.96 | 313.3 | 12 |
| 18.39 | 4.82 | 52.2 | 2 |
| 18.69 | 4.74 | 52.2 | 2 |
| 19.40 | 4.57 | 52.2 | 2 |
| 22.30 | 3.98 | 1462.2 | 56 |
| 22.56 | 3.94 | 809.4 | 31 |
| 23.09 | 3.85 | 261.1 | 10 |
| 23.51 | 3.78 | 731.1 | 28 |
| 23.84 | 3.73 | 130.6 | 5 |
| 24.27 | 3.66 | 443.9 | 17 |
| 25.16 | 3.54 | 1462.2 | 56 |
| 25.65 | 3.47 | 1175.0 | 45 |
| 26.32 | 3.38 | 208.9 | 8 |
| 26.89 | 3.31 | 339.4 | 13 |
| 28.47 | 3.13 | 339.4 | 13 |
| 29.24 | 3.05 | 235.0 | 9 |
| 30.19 | 2.96 | 104.4 | 4 |
| 30.92 | 2.89 | 78.3 | 3 |
| 31.35 | 2.85 | 52.2 | 2 |
| 33.07 | 2.71 | 78.3 | 3 |
| 33.84 | 2.65 | 130.6 | 5 |
| 34.28 | 2.61 | 26.1 | 1 |
| 34.71 | 2.58 | 52.2 | 2 |
| 34.94 | 2.57 | 52.2 | 2 |
| 35.22 | 2.55 | 26.1 | 1 |
| 36.25 | 2.48 | 104.4 | 4 |
| 37.31 | 2.41 | 52.2 | 2 |
| 38.14 | 2.36 | 52.2 | 2 |
| 38.97 | 2.31 | 26.1 | 1 |
| 39.34 | 2.29 | 26.1 | 1 |
| 39.94 | 2.26 | 26.1 | 1 |
| 40.33 | 2.23 | 26.1 | 1 |
| 42.16 | 2.14 | 52.2 | 2 |
| 42.83 | 2.11 | 26.1 | 1 |
| 44.63 | 2.03 | 78.3 | 3 |
| 45.44 | 1.99 | 130.6 | 5 |
| 46.52 | 1.95 | 52.2 | 2 |
| 47.16 | 1.93 | 182.8 | 7 |
| 48.79 | 1.86 | 104.4 | 4 |

Comparative Example I-3

The same as Example I-1, except that the template was a single kind of template: dicyclohexyl amine.
silica/alumina=30
NaOH/silica=0.09
dicyclohexyl amine/silica=0.35
water/silica=18.

In the XRD pattern of the obtained product, no obvious diffraction peak was observed.

Comparative Example I-4

A MCM-22 molecular sieve was produced in the same manner as Example 1 of U.S. Pat. No. 4,954,325, except that the calcination step was omitted, whereby obtaining a MCM-22 molecular sieve precursor. 100 g of the molecular sieve precursor (having a thermal weight loss of 18.8%, after removing water and organics therefrom, resulting in an actual precursor weight of 81.2 g) and 570 g hexadecyl trimethyl ammonium bromide (CTMABr) were weighted and added to a solution made of 1000 g of a 25 wt % tetrapropylammonium hydroxide (TPAOH) aqueous solution and 1400 g water, stirred at a constant temperature of 80 degrees Celsius for 16 h, and then ultrasonicated for 1 h, and then adjusted with a 10 wt % nitric acid solution till a pH value of 2 or less was reached. Then, the obtained mixture was washed to remove any surfactant, and then centrifugal-separated to obtain a solid. After drying, the solid was calcinated at 550 degrees Celsius under the air atmosphere for 6 h to remove organics. The XRD spectrum data of the obtained ITQ-2 molecular sieve were as illustrated in Table I-11. A measurement on the molecular sieve product revealed that, the total pore volume was 0.82 cm$^3$ g$^{-1}$, the micropore volume was 0.02 cm$^3$ g$^{-1}$, the total specific surface area was 750 m$^2$ g$^{-1}$, the external specific surface area was 675 m$^2$ g$^{-1}$, the external specific surface area accounted for 90.0% of the total specific surface area, the composition was that: a silica/alumina ratio by molar of 31.8, a product weight of 35 g with a product yield of 43.1%, a crystal thickness of 2.5 nm, a relative crystallinity of 52.5%, a non-crystal content of 47.5%.

TABLE I-11

| 2θ/° | d/Å | I | I/I$_0$ × 100 |
|---|---|---|---|
| 7.05 | 12.53 | 648.1 | 100 |
| 7.90 | 11.18 | 288.3 | 44 |
| 13.76 | 6.43 | 181.7 | 28 |
| 17.80 | 4.98 | 97.3 | 15 |
| 18.90 | 4.69 | 112.6 | 17 |
| 25.00 | 3.56 | 131.4 | 20 |
| 25.89 | 3.44 | 371.2 | 57 |
| 27.33 | 3.24 | 73.1 | 11 |

Comparative Example I-5

50 g of the molecular sieve produced in Comparative Example I-1 was weighted and exchanged with an ammonium nitrate solution having a concentration of 1 mol/L for 4 times, filtered, and dried, then thoroughly mixed with 20 g alumina, then there was added a 5 wt % nitric acid, kneaded, extruded into a bar of φ1.6×2 mm, then dried at 120 degrees Celsius, calcinated at 520 degrees Celsius under the air atmosphere for 6 h, produced into the desired catalyst.

0.3 g of the catalyst produced as aforesaid was weighted and loaded into a fixed-bed reactor, then there was introduced a mixture of benzene and ethylene. The reaction conditions are: an ethylene weight hourly space velocity of 3.0 h$^{-1}$, a ratio by molar of benzene to ethylene of 3.0, a reaction temperature of 205 degrees Celsius, a reaction pressure of 3.5 MPa. The operation continued for 24 h, then the reaction results are: an ethylene conversion of 92.2%, a selectivity by weight to ethyl benzene of 92.6%, a selectivity by weight to diethyl benzene of 7.1%, a selectivity by weight to triethyl benzene of 0.3%. The operation continued for 120 h, then the reaction results are: an ethylene conversion of 80.5%, a selectivity by weight to ethyl benzene of 85.5%, a selectivity by weight to diethyl benzene of 10.6%, a selectivity by weight to triethyl benzene of 0.4%, with the remaining being by-products. The operation continued for 10 days, the ethylene conversion decreased to 70% or less, then the catalyst was discharged, appearing as black, and then calcinated at 550 degrees Celsius under the air atmosphere for 5 h to conduct regeneration. The regenerated catalyst, under the aforesaid reaction conditions, was reused for the alkylation reaction in liquid phase of benzene and ethylene, The operation continued for 24 h, then the reaction results are: an ethylene conversion of 91.4%, a selectivity by weight to ethyl benzene of 87.3%, a selectivity by weight to diethyl benzene of 7.4%, a selectivity by weight to triethyl benzene of 0.3%, with the remaining being by-products.

Comparative Example I-6

50 g of the molecular sieve produced in Comparative Example I-1 was weighted and exchanged with an ammonium nitrate solution having a concentration of 1 mol/L for 4 times, filtered, and dried, then thoroughly mixed with 20 g alumina, there was added a 5 wt % nitric acid, kneaded, extruded into a bar of φ1.6×2 mm, then dried at 120 degrees Celsius, calcinated at 520 degrees Celsius under the air atmosphere for 6 h, produced into the desired catalyst.

0.3 g of the catalyst produced as aforesaid was weighted and loaded into a fixed-bed reactor, then there was introduced a mixture of benzene and propylene. The reaction conditions are: a propylene weight hourly space velocity of 5.0 h$^{-1}$, a ratio by molar of benzene to propylene of 3.0, a reaction temperature of 170 degrees Celsius, a reaction pressure of 3.0 MPa. The operation continued for 30 h, then the reaction results are: a propylene conversion of 93%, a selectivity by weight to isopropylbenzene of 83%, a selectivity by weight to diisopropylbenzene of 15.6%, a selectivity by weight to triisopropylbenzene of 0.4%, with the remaining being by-products. The operation continued for 120 h, then the reaction results are: a propylene conversion of 85%, a selectivity by weight to isopropylbenzene of 81.3%, a selectivity by weight to diisopropylbenzene of 15.9%, a selectivity by weight to triisopropylbenzene of 0.4%, with the remaining being by-products.

Comparative Example I-7

50 g of the molecular sieve produced in Comparative Example I-1 was weighted, and exchanged with an ammonium nitrate solution having a concentration of 1 mol/L for 4 times, filtered, and dried, then the dried sample was tableted (at a pressure of 15 MPa), screened, the product of 20-40 mesh was collected as the sample, calcinated at 520 degrees Celsius under the air atmosphere for 6 h, produced into the desired catalyst.

0.1 g cyclohexanone oxime, 10 g benzonitrile (as the solvent) and 0.1 g of the catalyst produced as aforesaid were sequentially added to a 50 mL flask equipped with a reflux condenser, reacted at 130 degrees Celsius for 2 h, to conduct the Beckmann rearrangement reaction of cyclohexanone oxime. The reaction results are: a cyclohexanone oxime conversion of 36.9%, a selectivity to caprolactam of 77.2%.

Comparative Example I-8

50 g of the molecular sieve produced in Comparative Example I-1 was weighted and exchanged with an ammonium nitrate solution having a concentration of 1 mol/L for 4 times, filtered, and dried. Then, the dried sample was tableted (at a pressure of 15 MPa), screened, the product of 20-40 mesh was collected as the sample, calcinated at 520 degrees Celsius under the air atmosphere for 6 h, produced into the desired catalyst.

0.1 g of the catalyst produced as aforesaid was weighted and loaded into a fixed-bed reactor, then there was introduced a mixture of biphenyl and propylene. The reaction conditions are: a biphenyl flow rate of 1.36 mol/h, a ratio by molar of biphenyl to propylene of 4.0, a reaction temperature of 250 degrees Celsius. The operation continued for 10 minutes, the biphenyl conversion was 1.9%. The operation continued for 2 h, the biphenyl conversion decreased nearly to 0. The catalyst was discharged and calcinated at 550 degrees Celsius under the air atmosphere for 5 h to conduct regeneration. The regenerated catalyst, under the aforesaid reaction conditions, was reused for the alkylation reaction of biphenyl and propylene, The operation continued for 10 minutes, the biphenyl conversion was 1.8%.

Comparative Example I-9

25 g of the molecular sieve produced in Comparative Example I-4 was weighted and exchanged with an ammonium nitrate solution having a concentration of 1 mol/L for 4 times, filtered, and dried, then thoroughly mixed with 10 g alumina, then there was added a 5 wt % nitric acid, kneaded, extruded into a bar of φ1.6×2 mm, then dried at 120 degrees Celsius, calcinated at 520 degrees Celsius under the air atmosphere for 6 h, produced into the desired catalyst.

0.3 g of the catalyst produced as aforesaid was weighted and loaded into a fixed-bed reactor, then there was introduced a mixture of benzene and ethylene. The reaction conditions are: an ethylene weight hourly space velocity of 3.0 $h^{-1}$, a ratio by molar of benzene to ethylene of 3.0, a reaction temperature of 205 degrees Celsius, a reaction pressure of 3.5 MPa. The operation continued for 24 h, then the reaction results are: an ethylene conversion of 71.6%, a selectivity by weight to ethyl benzene of 85.8%, a selectivity by weight to diethyl benzene of 13.7%, a selectivity by weight to triethyl benzene of 0.3%, with the remaining being by-products. The operation continued for 120 h, then the reaction results are: an ethylene conversion of 57.3%, a selectivity by weight to ethyl benzene of 87.5%, a selectivity by weight to diethyl benzene of 11.6%, a selectivity by weight to triethyl benzene of 0.4%, with the remaining being by-products. The operation continued for 10 days, the ethylene conversion decreased to 40% or less. The catalyst was discharged, appearing as black, calcinated at 550 degrees Celsius under the air atmosphere for 5 h to conduct regeneration. The regenerated catalyst, under the aforesaid reaction conditions, was reused for the alkylation reaction in liquid phase of benzene and ethylene, The operation continued for 24 h, then the reaction results are: an ethylene conversion of 62.4%, the activity decreased dramatically, indicating that the activity of the catalyst failed to be recovered to the same level of a fresh catalyst.

Comparative Example I-10

25 g of the molecular sieve produced in Comparative Example I-4 was weighted and exchanged with an ammonium nitrate solution having a concentration of 1 mol/L for 4 times, filtered, and dried, then thoroughly mixed with 10 g alumina, then there was added a 5 wt % nitric acid, kneaded, extruded into a bar of φ1.6×2 mm, then dried at 120 degrees Celsius, calcinated at 520 degrees Celsius under the air atmosphere for 6 h, produced into the desired catalyst.

0.3 g of the catalyst produced as aforesaid was weighted and loaded into a fixed-bed reactor, then there was introduced a mixture of benzene and propylene. The reaction conditions are: a propylene weight hourly space velocity of 5.0 $h^{-1}$, a ratio by molar of benzene to propylene of 3.0, a reaction temperature of 170 degrees Celsius, a reaction pressure of 3.0 MPa. The operation continued for 30 h, then the reaction results are: a propylene conversion of 74%, a selectivity by weight to isopropylbenzene of 87%, a selectivity by weight to diisopropylbenzene of 12.1%, a selectivity by weight to triisopropylbenzene of 0.3%, with the remaining being by-products. The operation continued for 120 h, then the reaction results are: a propylene conversion of 61%, a selectivity by weight to isopropylbenzene of 87.3%, a selectivity by weight to diisopropylbenzene of 11.9%, a selectivity by weight to triisopropylbenzene of 0.3%, with the remaining being by-products.

Comparative Example I-11

8 g of the molecular sieve produced in Comparative Example I-4 was weighted and exchanged with an ammonium nitrate solution having a concentration of 1 mol/L for 4 times, filtered, and dried. Then, the dried sample was tableted (at a pressure of 15 MPa), screened, the product of 20-40 mesh was collected as the sample, calcinated at 520 degrees Celsius under the air atmosphere for 6 h, produced into the desired catalyst.

0.1 g cyclohexanone oxime, 10 g benzonitrile (as the solvent) and 0.1 g of the catalyst produced as aforesaid were sequentially added to a 50 mL flask equipped with a reflux condenser, reacted at 130 degrees Celsius for 2 h, to conduct the Beckmann rearrangement reaction of cyclohexanone oxime. The reaction results are: a cyclohexanone oxime conversion of 65.5%, a selectivity to caprolactam of 79.1%.

Comparative Example I-12

8 g of the molecular sieve produced in Comparative Example I-4 was weighted and exchanged with an ammonium nitrate solution having a concentration of 1 mol/L for 4 times, filtered, and dried. Then, the dried sample was tableted (at a pressure of 15 MPa), screened, the product of 20-40 mesh was collected as the sample, calcinated at 520 degrees Celsius under the air atmosphere for 6 h, produced into the desired catalyst.

0.1 g of the catalyst produced as aforesaid was weighted and loaded into a fixed-bed reactor, then there was introduced a mixture of biphenyl and propylene.

The reaction conditions are: a biphenyl flow rate of 1.36 mol/h, a ratio by molar of biphenyl to propylene of 4.0, a reaction temperature of 250 degrees Celsius. The operation continued for 10 minutes, then the biphenyl conversion was 4%. The operation continued for 2 h, the biphenyl conversion decreased nearly to 0. The catalyst was discharged and calcinated at 550 degrees Celsius under the air atmosphere for 5 h to conduct regeneration. The regenerated catalyst, under the aforesaid reaction conditions, was reused for the alkylation reaction of biphenyl and propylene, The operation continued for 10 minutes, the biphenyl conversion was 2.8%, the activity decreased dramatically, indicating that the activity of the catalyst failed to be recovered to the same level of a fresh catalyst.

The following examples illustrate the production of a SCM-2 molecular sieve.

Example II-1

12.64 g sodium aluminate ($Al_2O_3$ 43.0 wt %, $Na_2O$ 35.0 wt %) was firstly dissolved into 362.40 g water, then under stirring, there were added the organic templates: 39.68 g of an aqueous hexamethyleneimine solution (with a hexamethyleneimine content of 80.0 wt %), 101.54 g dicyclohexylamine, finally there was added 240 g silica sol (with a silica content of 40.0 wt %), wherein the ratios by molar between the starting materials were:

silica/alumina=30
NaOH/silica=0.09
hexamethylene imine/silica=0.2
dicyclohexyl amine/silica=0.35
water/silica=18.

The resultant was mixed till homogeneous, loaded into a stainless reactor, and then under stirring at 150 degrees Celsius crystallized for 4 days, upon completion of the crystallization, filtered, washed and dried, to obtain a molecular sieve. The XRD spectrum data of the molecular sieve product were as illustrated in Table II-1, while the XRD pattern thereof was as illustrated in FIG. 2. A measurement on the molecular sieve product revealed that, the total pore volume was 0.68 cm$^3$ g$^{-1}$, the micropore volume was 0.12 cm$^3$ g$^{-1}$, the total specific surface area was 524 m$^2$·g$^{-1}$, the external specific surface area was 248 m$^2$·g$^{-1}$, the external specific surface area accounted for 47.3% of the total specific surface area, the composition was that: a silica/alumina ratio by molar of 29.3, a water/silica ratio by weight of 0.07, an organic template/silica ratio by weight of 0.15, a molecular sieve yield of 92%, a crystal thickness of 5.4 nm.

TABLE II-1

| 2θ/° | d/Å | I/I$_0$ × 100 |
|---|---|---|
| 3.86 | 22.90 | 7 |
| 6.38 | 13.84 | 15 |
| 7.15 | 12.36 | 100 |
| 7.94 | 11.13 | 23 |
| 9.54 | 9.27 | 12 |
| 12.79 | 6.92 | 10 |
| 19.74 | 4.49 | 20 |
| 21.96 | 4.04 | 25 |
| 22.54 | 3.94 | 20 |
| 24.94 | 3.57 | 17 |
| 25.97 | 3.43 | 51 |
| 26.46 | 3.37 | 27 |

Example II-2

12.64 g sodium aluminate (Al$_2$O$_3$ 43.0 wt %, Na$_2$O 35.0 wt %) was firstly dissolved into 362.40 g water, then under stirring, there were added the organic templates: 39.68 g of an aqueous hexamethylene imine solution (with a hexamethylene imine content of 80.0 wt %), 145.06 g dicyclohexyl amine, finally there was added 240 g silica sol (with a silica content of 40.0 wt %), wherein the ratios by molar between the starting materials were:
  silica/alumina=30
  NaOH/silica=0.09
  hexamethylene imine/silica=0.2
  dicyclohexyl amine/silica=0.50
  water/silica=18.

The resultant was mixed till homogeneous, loaded into a stainless reactor, and then under stirring at 150 degrees Celsius crystallized for 108 h, upon completion of the crystallization, filtered, washed and dried, to obtain a molecular sieve. The XRD spectrum data of the molecular sieve product were as illustrated in Table II-2, while the XRD pattern thereof is similar to FIG. 2. A measurement on the molecular sieve product revealed that, the total pore volume was 0.76 cm$^3$ g$^{-1}$, the micropore volume was 0.12 cm$^3$ g$^{-1}$, the total specific surface area was 533 m$^2$·g$^{-1}$, the external specific surface area was 257 m$^2$·g$^{-1}$, the external specific surface area accounted for 48.2% of the total specific surface area, the composition was that: a silica/alumina ratio by molar of 28.6, a water/silica ratio by weight of 0.06, an organic template/silica ratio by weight of 0.17, a molecular sieve yield of 82%, a crystal thickness of 5.1 nm.

TABLE II-2

| 2θ/° | d/Å | I/I$_0$ × 100 |
|---|---|---|
| 3.87 | 22.81 | 10 |
| 6.39 | 13.82 | 12 |
| 7.17 | 12.32 | 100 |
| 7.98 | 11.07 | 21 |
| 9.53 | 9.27 | 10 |
| 12.82 | 6.90 | 9 |
| 19.74 | 4.49 | 18 |
| 21.94 | 4.05 | 22 |
| 22.57 | 3.94 | 25 |
| 24.96 | 3.56 | 18 |
| 26.03 | 3.42 | 41 |
| 26.46 | 3.37 | 24 |

Example II-3

The same as Example II-1, except that silica/alumina=100, NaOH/silica=0.20, homopiperazine/silica=0.35, dicyclohexyl amine/silica=0.2, water/silica=20, at 150 degrees Celsius crystallized for 72 h.

The XRD spectrum data of the molecular sieve product were as illustrated in Table II-3, while the XRD pattern thereof is similar to FIG. 2. A measurement on the molecular sieve product revealed that, the total pore volume was 0.88 cm$^3$ g$^{-1}$, the micropore volume was 0.13 cm$^3$ g$^{-1}$, the total specific surface area was 583 m$^2$·g$^{-1}$, the external specific surface area was 313 m$^2$·g$^{-1}$, the external specific surface area accounted for 53.7% of the total specific surface area, the composition was that: a silica/alumina ratio by molar of 90.5, a water/silica ratio by weight of 0.05, an organic template/silica ratio by weight of 0.15, a molecular sieve yield of 81%, a crystal thickness of 5.6 nm.

TABLE II-3

| 2θ/° | d/Å | I/I$_0$ × 100 |
|---|---|---|
| 3.85 | 22.93 | 7 |
| 6.37 | 13.86 | 11 |
| 7.17 | 12.32 | 100 |
| 7.98 | 11.07 | 25 |
| 9.56 | 9.24 | 13 |
| 12.81 | 6.90 | 13 |
| 19.72 | 4.50 | 21 |
| 21.94 | 4.05 | 27 |
| 22.52 | 3.94 | 27 |
| 24.90 | 3.57 | 13 |
| 25.99 | 3.42 | 46 |
| 26.44 | 3.37 | 23 |

Example II-4

The same as Example II-1, except that silica/alumina=50, NaOH/silica=0.07, homopiperazine/silica=0.33, N,N-diethyl cyclohexylamine/silica=0.50, water/silica=24, at 150 degrees Celsius crystallized for 3 days.

The XRD spectrum data of the molecular sieve product were as illustrated in Table II-4, while the XRD pattern thereof is similar to FIG. 2. A measurement on the molecular sieve product revealed that, the total pore volume was 0.80 cm$^3$ g$^{-1}$, the micropore volume was 0.11 cm$^3$ g$^{-1}$, the total specific surface area was 511 m$^2$·g$^{-1}$, the external specific surface area was 224 m$^2$·g$^{-1}$, the external specific surface area accounted for 43.8% of the total specific surface area, the composition was that: a silica/alumina ratio by molar of 46.1, a water/silica ratio by weight of 0.06, an organic template/silica ratio by weight of 0.16, a molecular sieve yield of 85%, a crystal thickness of 5.1 nm.

TABLE II-4

| 2θ/° | d/Å | I/I₀ × 100 |
|---|---|---|
| 3.90 | 22.64 | 8 |
| 6.40 | 13.80 | 15 |
| 7.18 | 12.30 | 100 |
| 7.92 | 11.15 | 24 |
| 9.55 | 9.25 | 14 |
| 12.77 | 6.93 | 12 |
| 19.74 | 4.49 | 24 |
| 21.94 | 4.05 | 27 |
| 22.51 | 3.95 | 26 |
| 24.95 | 3.57 | 15 |
| 25.95 | 3.43 | 48 |
| 26.49 | 3.36 | 25 |

Example II-5

The same as Example II-1, except that silica/alumina=26, KOH/silica=0.25, hexamethylene imine/silica=1.0, N-methyl dicyclohexyl amine/silica=0.60, water/silica=16, at 150 degrees Celsius crystallized for 30 h.

The XRD spectrum data of the molecular sieve product were as illustrated in Table II-5, while the XRD pattern thereof is similar to FIG. 2. A measurement on the molecular sieve product revealed that, the total pore volume was 0.66 cm$^3$ g$^{-1}$, the micropore volume was 0.12 cm$^3$ g$^{-1}$, the total specific surface area was 501 m$^2$·g$^{-1}$, the external specific surface area was 232 m$^2$·g$^{-1}$, the external specific surface area accounted for 46.3% of the total specific surface area, the composition was that: a silica/alumina ratio by molar of 26.3, a water/silica ratio by weight of 0.05, an organic template/silica ratio by weight of 0.18, a molecular sieve yield of 85%, a crystal thickness of 5.7 nm.

TABLE II-5

| 2θ/° | d/Å | I/I₀ × 100 |
|---|---|---|
| 3.78 | 23.36 | 9 |
| 6.31 | 14.00 | 13 |
| 7.15 | 12.36 | 100 |
| 7.95 | 11.11 | 22 |
| 9.53 | 9.27 | 13 |
| 12.79 | 6.92 | 8 |
| 19.71 | 4.50 | 19 |
| 21.87 | 4.06 | 21 |
| 22.54 | 3.94 | 19 |
| 24.96 | 3.56 | 12 |
| 25.99 | 3.42 | 47 |
| 26.45 | 3.37 | 23 |

Example II-6

The same as Example II-1, except that silica/alumina=40, KOH/silica=0.2, piperidine/silica=0.8, quinoline/silica=0.65, water/silica=17, at 150 degrees Celsius crystallized for 60 h.

The XRD spectrum data of the molecular sieve product were as illustrated in Table II-6, while the XRD pattern thereof is similar to FIG. 2. A measurement on the molecular sieve product revealed that, the total pore volume was 0.62 cm$^3$ g$^{-1}$, the micropore volume was 0.13 cm$^3$ g$^{-1}$, the total specific surface area was 496 m$^2$·g$^{-1}$, the external specific surface area was 227 m$^2$·g$^{-1}$, the external specific surface area accounted for 45.8% of the total specific surface area, the composition was that: a silica/alumina ratio by molar of 39.7, a water/silica ratio by weight of 0.07, an organic template/silica ratio by weight of 0.17, a molecular sieve yield of 89%, a crystal thickness of 5.5 nm.

TABLE II-6

| 2θ/° | d/Å | I/I₀ × 100 |
|---|---|---|
| 3.88 | 22.75 | 7 |
| 6.38 | 13.84 | 16 |
| 7.15 | 12.36 | 100 |
| 7.96 | 11.10 | 23 |
| 9.58 | 9.22 | 10 |
| 12.82 | 6.90 | 10 |
| 19.77 | 4.49 | 22 |
| 21.95 | 4.04 | 28 |
| 22.55 | 3.94 | 24 |
| 24.92 | 3.57 | 16 |
| 25.99 | 3.42 | 49 |
| 26.43 | 3.37 | 25 |

Example II-7

The same as Example II-1, except that silica/alumina=40, KOH/silica=0.2, hexamethylene imine/silica=0.2, piperidine/silica=0.2, dicyclohexyl amine/silica=0.4, water/silica=19, at 150 degrees Celsius crystallized for 4 days. The XRD spectrum data of the molecular sieve product were as illustrated in Table II-7, while the XRD pattern thereof is similar to FIG. 2. A measurement on the molecular sieve product revealed that, the total pore volume was 0.71 cm$^3$ g$^{-1}$, the micropore volume was 0.14 cm$^3$ g$^{-1}$, the total specific surface area was 561 m$^2$·g$^{-1}$, the external specific surface area was 271 m$^2$·g$^{-1}$, the external specific surface area accounted for 48.3% of the total specific surface area, the composition was that: a silica/alumina ratio by molar of 39.0, a water/silica ratio by weight of 0.07, an organic template/silica ratio by weight of 0.16, a molecular sieve yield of 88%, a crystal thickness of 5.5 nm.

TABLE II-7

| 2θ/° | d/Å | I/I₀ × 100 |
|---|---|---|
| 3.88 | 22.75 | 11 |
| 6.39 | 13.82 | 13 |
| 7.17 | 12.32 | 100 |
| 7.93 | 11.14 | 22 |
| 9.51 | 9.29 | 11 |
| 12.83 | 6.89 | 8 |
| 19.72 | 4.50 | 25 |
| 21.96 | 4.04 | 22 |
| 22.54 | 3.94 | 27 |
| 24.95 | 3.57 | 17 |
| 25.96 | 3.43 | 54 |
| 26.45 | 3.37 | 27 |

Example II-8

The same as Example II-1, except that silica/alumina=40, KOH/silica=0.12, hexamethylene imine/silica=0.23, N,N-diethyl cyclohexylamine/silica=0.35, dicyclohexyl amine/silica=0.05, water/silica=19, at 150 degrees Celsius crystallized for 80 h.

The XRD spectrum data of the molecular sieve product were as illustrated in Table II-8, while the XRD pattern thereof is similar to FIG. 2. A measurement on the molecular sieve product revealed that, the total pore volume was 0.75 cm$^3$ g$^{-1}$, the micropore volume was 0.12 cm$^3$ g$^{-1}$, the total specific surface area was 518 m$^2$·g$^{-1}$, the external specific surface area was 240 m$^2$·g$^{-1}$, the external specific surface area accounted for 46.3% of the total specific surface area, the composition was that: a silica/alumina ratio by molar of 40.4, a water/silica ratio by weight of 0.06, an organic template/silica ratio by weight of 0.15, a molecular sieve yield of 81%, a crystal thickness of 5.3 nm.

TABLE II-8

| 2θ/° | d/Å | I/I$_0$ × 100 |
|---|---|---|
| 3.92 | 22.52 | 8 |
| 6.43 | 13.73 | 14 |
| 7.19 | 12.28 | 100 |
| 7.93 | 11.14 | 25 |
| 9.52 | 9.28 | 12 |
| 12.76 | 6.87 | 10 |
| 19.76 | 4.49 | 23 |
| 21.98 | 4.04 | 26 |
| 22.56 | 3.94 | 23 |
| 25.02 | 3.56 | 14 |
| 25.94 | 3.43 | 55 |
| 26.42 | 3.37 | 26 |

Example II-9

50 g of the molecular sieve produced in Example II-1 was weighted, heated at 550 degrees Celsius under an air or oxygen atmosphere for 5 h, then exchanged with an ammonium nitrate solution having a concentration of 1 mol/L for 4 times, filtered, and dried, then thoroughly mixed with 20 g alumina, then there was added a 5 wt % nitric acid, kneaded, extruded into a bar of φ1.6×2 mm, then dried at 120 degrees Celsius, calcinated at 520 degrees Celsius under the air atmosphere for 6 h, produced into the desired catalyst.

1.0 g of the catalyst produced as aforesaid was weighted and loaded into a fixed-bed reactor, then there was introduced a mixture of benzene and ethylene. The reaction conditions are: an ethylene weight hourly space velocity of 3.0 h$^{-1}$, a ratio by molar of benzene to ethylene of 2.0, a reaction temperature of 205 degrees Celsius, a reaction pressure of 3.0 MPa. The operation continued for 4 days, then the reaction results are: an ethylene conversion of 98%, a selectivity by weight to ethyl benzene of 90.6%, a selectivity by weight to diethyl benzene of 9.0%, a selectivity by weight to triethyl benzene of 0.2%, with the remaining being by-products.

Example II-10

50 g of the molecular sieve produced in Example II-2 was weighted and heated at 550 degrees Celsius under an air or oxygen atmosphere for 5 h, then exchanged with an ammonium nitrate solution having a concentration of 1 mol/L for 4 times, filtered, and dried, then thoroughly mixed with 20 g alumina, then there was added a 5 wt % nitric acid, kneaded, extruded into a bar of φ1.6×2 mm, then dried at 120 degrees Celsius, calcinated at 520 degrees Celsius under the air atmosphere for 6 h, produced into the desired catalyst.

1.0 g of the catalyst produced as aforesaid was weighted and loaded into a fixed-bed reactor, then there was introduced a mixture of benzene and ethylene. The reaction conditions are: an ethylene weight hourly space velocity of 5.0 h$^{-1}$, a ratio by molar of benzene to ethylene of 3.0, a reaction temperature of 195 degrees Celsius, a reaction pressure of 3.5 MPa. The operation continued for 5 days, then the reaction results are: an ethylene conversion of 98%, a selectivity by weight to ethyl benzene of 93.6%, a selectivity by weight to diethyl benzene of 5.9%, a selectivity by weight to triethyl benzene of 0.1%, with the remaining being by-products.

Example II-11

50 g of the molecular sieve produced in Example II-1 was weighted, heated at 550 degrees Celsius under an air or oxygen atmosphere for 5 h, then exchanged with an ammonium nitrate solution having a concentration of 1 mol/L for 4 times, filtered, and dried, then thoroughly mixed with 20 g alumina, there was added a 5 wt % nitric acid, kneaded, extruded into a bar of φ1.6×2 mm, then dried at 120 degrees Celsius, calcinated at 520 degrees Celsius under the air atmosphere for 6 h, produced into the desired catalyst.

1.0 g of the catalyst produced as aforesaid was weighted and loaded into a fixed-bed reactor, then there was introduced a mixture of benzene and propylene. The reaction conditions are: a propylene weight hourly space velocity of 5.0 h$^{-1}$, a ratio by molar of benzene to propylene of 3.0, a reaction temperature of 170 degrees Celsius, a reaction pressure of 3.0 MPa. The operation continued for 48 h, then the reaction results are: a propylene conversion of 97%, a selectivity by weight to isopropylbenzene of 85%, a selectivity by weight to diisopropylbenzene of 14.3%, a selectivity by weight to triisopropylbenzene of 0.4%, with the remaining being by-products.

Comparative Example II-1

A MCM-22 molecular sieve was produced in the same manner as Example 1 of U.S. Pat. No. 4,954,325. The XRD spectrum data of the produced MCM-22 molecular sieve were as illustrated in Table II-9, while the XRD pattern thereof was as illustrated in FIG. 2. A measurement on the MCM-22 molecular sieve revealed that, the total pore volume was 0.46 cm$^3$·g$^{-1}$, the micropore volume was 0.18 cm$^3$·g$^{-1}$, the total specific surface area was 485 m$^2$·g$^{-1}$, the external specific surface area was 120 m$^2$·g$^{-1}$, the external specific surface area accounted for 24.7% of the total specific surface area, the composition was that: a silica/alumina ratio by molar of 29.1.

TABLE II-9

| 2θ/° | d/Å | I/I$_0$ × 100 |
|---|---|---|
| 3.20 | 27.55 | 81 |
| 6.68 | 13.23 | 87 |
| 7.25 | 12.19 | 100 |
| 8.02 | 11.02 | 47 |
| 9.73 | 9.08 | 41 |
| 13.01 | 6.80 | 16 |
| 14.92 | 5.93 | 9 |
| 19.89 | 4.46 | 34 |
| 22.16 | 4.01 | 19 |
| 22.50 | 3.95 | 19 |
| 25.12 | 3.54 | 22 |
| 26.11 | 3.41 | 84 |
| 26.64 | 3.34 | 35 |
| 29.23 | 3.05 | 5 |
| 31.67 | 2.82 | 5 |
| 33.62 | 2.66 | 5 |
| 36.56 | 2.46 | 4 |
| 37.92 | 2.37 | 9 |
| 44.65 | 2.03 | 5 |
| 46.37 | 1.96 | 8 |
| 48.50 | 1.88 | 5 |

Comparative Example II-2

The same as Example II-1, except that the template was a single kind of template: piperidine.

silica/alumina=30

NaOH/silica=0.15 piperidine/silica=0.2 water/silica=18.

The XRD spectrum data of the produced molecular sieve were as illustrated in Table II-10, while the XRD pattern thereof is totally different from FIG. 2. A measurement on the molecular sieve product revealed that, the total pore volume was 0.13 cm$^3$·g$^{-1}$, the micropore volume was 0.10 cm$^3$·g$^{-1}$, the total specific surface area was 285 m$^2$·g$^{-1}$, the external specific surface area was 31 m$^2$·g$^{-1}$, the external specific surface area accounted for 10.9% of the total specific surface area, the composition was that: a silica/alumina ratio by molar of 28.1.

TABLE II-10

| 2θ/° | d/Å | I/I$_0$ × 100 |
|---|---|---|
| 7.78 | 11.35 | 7 |
| 9.30 | 9.50 | 100 |
| 12.51 | 7.07 | 17 |
| 12.75 | 6.94 | 15 |
| 13.42 | 6.59 | 17 |
| 15.34 | 5.77 | 9 |
| 15.63 | 5.66 | 3 |
| 17.88 | 4.96 | 12 |
| 18.39 | 4.82 | 2 |
| 18.69 | 4.74 | 2 |
| 19.40 | 4.57 | 2 |
| 22.30 | 3.98 | 56 |
| 22.56 | 3.94 | 31 |
| 23.09 | 3.85 | 10 |
| 23.51 | 3.78 | 28 |
| 23.84 | 3.73 | 5 |
| 24.27 | 3.66 | 17 |
| 25.16 | 3.54 | 56 |
| 25.65 | 3.47 | 45 |
| 26.32 | 3.38 | 8 |
| 26.89 | 3.31 | 13 |
| 28.47 | 3.13 | 13 |
| 29.24 | 3.05 | 9 |
| 30.19 | 2.96 | 4 |
| 30.92 | 2.89 | 3 |
| 31.35 | 2.85 | 2 |
| 33.07 | 2.71 | 3 |
| 33.84 | 2.65 | 5 |
| 34.28 | 2.61 | 1 |
| 34.71 | 2.58 | 2 |
| 34.94 | 2.57 | 2 |
| 35.22 | 2.55 | 1 |
| 36.25 | 2.48 | 4 |
| 37.31 | 2.41 | 2 |
| 38.14 | 2.36 | 2 |
| 38.97 | 2.31 | 1 |
| 39.34 | 2.29 | 1 |
| 39.94 | 2.26 | 1 |
| 40.33 | 2.23 | 1 |
| 42.16 | 2.14 | 2 |
| 42.83 | 2.11 | 1 |
| 44.63 | 2.03 | 3 |
| 45.44 | 1.99 | 5 |
| 46.52 | 1.95 | 2 |
| 47.16 | 1.93 | 7 |
| 48.79 | 1.86 | 4 |

Comparative Example II-3

The same as Example II-1, except that the template was a single kind of template: dicyclohexyl amine.

silica/alumina=30

NaOH/silica=0.09 dicyclohexyl amine/silica=0.35 water/silica=18.

In the XRD pattern of the obtained product, no obvious diffraction peak was observed.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A molecular sieve, characterized by having an empirical chemical composition as illustrated by the formula "a first oxide·a second oxide", wherein the ratio by molar of the first oxide to the second oxide is 25-200, the first oxide is one or more selected from the group consisting of silica and germanic oxide, the second oxide is one or more selected from the group consisting of alumina, boron oxide, iron oxide, gallium oxide, titanium oxide, rare earth oxides, indium oxide and vanadium oxide, and the molecular sieve has an X ray diffraction pattern as substantially illustrated in the following table,

| 2θ (°) | d-spacing (Å) | relative intensity (I/I$_0$ × 100) |
|---|---|---|
| 4.22 ± 0.30 | 21.04 ± 1.48 | w-s |
| 7.17 ± 0.18 | 12.32 ± 0.31 | vs |
| 7.99 ± 0.20 | 11.07 ± 0.28 | m-s |
| 9.71 ± 0.13 | 9.10 ± 0.12 | m-s |
| 14.37 ± 0.14 | 6.16 ± 0.06 | m-s |
| 22.67 ± 0.29 | 3.92 ± 0.05 | w-m |
| 26.03 ± 0.23 | 3.42 ± 0.03 | s. |

2. The molecular sieve according to claim 1, wherein the X ray diffraction pattern further includes X-ray diffraction peaks as substantially illustrated in the following table,

| 2θ (°) | d-spacing (Å) | relative intensity (I/I$_0$ × 100) |
|---|---|---|
| 12.86 ± 0.19 | 6.88 ± 0.10 | w |
| 15.90 ± 0.14 | 5.57 ± 0.05 | w |
| 20.26 ± 0.23 | 4.38 ± 0.05 | w |
| 21.93 ± 0.38 | 4.05 ± 0.07 | m |
| 23.65 ± 0.32 | 3.76 ± 0.05 | w |
| 25.07 ± 0.29 | 3.55 ± 0.04 | w |
| 26.92 ± 0.25 | 3.31 ± 0.03 | w. |

3. A molecular sieve, characterized by having an empirical chemical composition as illustrated by the formula "a first oxide·a second oxide" or the formula "a first oxide·a second oxide·an organic template·water", wherein the ratio by molar of the first oxide to the second oxide is 25-200, the ratio by weight of the organic template to the first oxide is 0.07-0.27, the ratio by weight of water to the first oxide is 0.02-0.11, the first oxide is one or more selected from the group consisting of silica and germanic oxide, the second oxide is one or more selected from the group consisting of alumina, boron oxide, iron oxide, gallium oxide, titanium oxide, rare earth oxides, indium oxide and vanadium oxide, and the molecular sieve has an X ray diffraction pattern as substantially illustrated in the following table,

| 2θ (°) | d-spacing (Å) | relative intensity (I/I$_0$ × 100) |
|---|---|---|
| 6.38 ± 0.14 | 13.84 ± 0.30 | w |
| 7.15 ± 0.13 | 12.36 ± 0.22 | vs |
| 7.94 ± 0.12 | 11.13 ± 0.17 | m |
| 9.54 ± 0.13 | 9.27 ± 0.13 | w-m |
| 21.98 ± 0.17 | 4.04 ± 0.03 | m |
| 25.96 ± 0.15 | 3.43 ± 0.02 | m-s |
| 26.43 ± 0.16 | 3.37 ± 0.02 | m. |

4. The molecular sieve according to claim 3, wherein the X ray diffraction pattern further includes X-ray diffraction peaks as substantially illustrated in the following table,

| 2θ (°) | d-spacing (Å) | relative intensity (I/I$_0$ × 100) |
|---|---|---|
| 3.87 ± 0.20 | 22.90 ± 1.21 | w |
| 12.79 ± 0.20 | 6.92 ± 0.11 | w |
| 19.76 ± 0.31 | 4.49 ± 0.07 | w-m |
| 22.55 ± 0.23 | 3.94 ± 0.04 | w-m |
| 24.92 ± 0.14 | 3.57 ± 0.02 | w. |

5. The molecular sieve according to claim 1 or 3, wherein the total pore volume, which is determined by the BET method, is 0.55-0.90 cm$^3$/g, the total specific surface area, which is determined by the BET method, is 480-680 m$^2$/g, the external specific surface area, which is determined by the BET method, is 200-400 m$^2$/g, and the external specific surface area accounts for 45-65% of the total specific surface area.

6. The molecular sieve according to claim 1 or 3, having a MWW topological framework structure, wherein at least 80% of all crystals thereof are flake crystals having a thickness of about 5 nm, which is determined by the TEM method.

7. A process for producing a molecular sieve according to claim 1 or 3, including a step of under crystallization conditions, contacting a first oxide source, a second oxide source, an alkali source, an organic template, an optional halogen source and water, to obtain a molecular sieve, and optionally, a step of calcinating the obtained molecular sieve, wherein the organic template is the combination of a first organic template and a second organic template, the ratio by molar of the first organic template to the second organic template is 0.3-3.5, the first organic template is one or more selected from the group consisting of hexamethyleneimine, piperidine, 2-methyl piperidine and homopiperazine, the second organic template is one or more selected from the group consisting of N,N-diethyl cyclohexylamine, dicyclohexylamine, N-methyl dicyclohexylamine, and quinoline.

8. The process according to claim 7, wherein the ratio by molar between the first oxide source calculated as the first oxide, the second oxide source calculated as the second oxide, the alkali source, the organic template, the halogen source and water is 1:(0.005-0.04):(0.05-0.2):(0.2-1.0):(0-0.3):(10-40), the crystallization conditions include: a crystallization temperature of 145-170 degrees Celsius, a crystallization duration of 2-5 days, and the calcination conditions include: a calcination temperature of 400-650 degrees Celsius, a calcination duration of 3-6 h.

9. A molecular sieve composition, comprising the molecular sieve according to claim 1 or 3 and a binder.

10. A method of using the molecular sieve according to claim 1 or 3, comprising a step of applying the molecular sieve according to claim 1 or 3 as an adsorbent in an absorbing process, applying the molecular sieve according to claim 1 or 3 as an alkylation catalyst in an organic compound converting reaction, applying the molecular sieve according to claim 1 or 3 as an olefin hydration catalyst in an organic compound converting reaction, applying the molecular sieve according to claim 1 or 3 as an olefin oxidation catalyst in an organic compound converting reaction, applying the molecular sieve according to claim 1 or 3 as a hydrocracking catalyst in an organic compound converting reaction, or applying the molecular sieve according to claim 1 or 3 an olefin isomerization catalyst in an organic compound converting reaction.

* * * * *